United States Patent [19]
Shirai et al.

[11] Patent Number: 5,734,654
[45] Date of Patent: Mar. 31, 1998

[54] FRAME RELAY SWITCHING APPARATUS AND ROUTER

[75] Inventors: Nobuo Shirai; Yukio Sone; Kana Izumi, all of Kawasaki, Japan

[73] Assignee: Fujitsu Limited, Kanagawa, Japan

[21] Appl. No.: 284,791

[22] Filed: Aug. 2, 1994

[30] Foreign Application Priority Data

Aug. 5, 1993 [JP] Japan ................... 5-193779
Mar. 18, 1994 [JP] Japan ................... 6-049387

[51] Int. Cl.⁶ ........................................ H04L 12/56
[52] U.S. Cl. ........................................ 370/396; 370/401
[58] Field of Search ................... 370/60, 60.1, 94.1, 370/94.3, 85.6, 389, 394, 392, 395, 396, 400, 401, 402, 404, 412, 418, 429, 902, 912, 905, 908, 444; 340/825.5, 825.51, 825.52, 825.01, 825.03

[56] References Cited

U.S. PATENT DOCUMENTS

| | | | |
|---|---|---|---|
| 5,130,984 | 7/1992 | Cisneros | 370/399 |
| 5,140,417 | 8/1992 | Tanaka et al. | 375/112 |
| 5,140,584 | 8/1992 | Suzuki | 370/60 |
| 5,224,099 | 6/1993 | Corbalis et al. | 370/412 |
| 5,237,564 | 8/1993 | Lespagnol et al. | 370/60 |
| 5,355,372 | 10/1994 | Sengupta et al. | 370/60.1 |
| 5,390,184 | 2/1995 | Morris | 370/60 |
| 5,398,235 | 3/1995 | Tsuzuki et al. | 370/60 |

FOREIGN PATENT DOCUMENTS 358646  3/1991  Japan.
3201641  9/1991  Japan.

Primary Examiner—Dang Ton
Attorney, Agent, or Firm—Helfgott & Karas, P.C.

[57] ABSTRACT

A frame relay switching apparatus in a frame relay network employs a frame format used in a frame relay communication between a plurality of terminals, performed by identifying a destination by a data link connection identifier (DLCI) in an address field. Priority or non-priority information for an identifier provided in a frame being transmitted for identifying a destination terminal is registered for each DLCI so that a zone assigned to each of them is not overflown, to prevent a frame having a priority DLCI from being discarded. In case of congestion, all frames having identical non-priority DLCIs are discarded at the same time. The switching apparatus includes a plurality of transmitting buffers provided at each outgoing line, and a common buffer, which can be shared by a plurality of lines. A congested line writes a received frame in the common buffer and takes the frame out from the common buffer to write it in a respective transmitting buffer when the congestion has been resolved. When performing inter-LAN communication, a router sets a priority level, which is determined in accordance with a destination address on a LAN and a LAN protocol, in the address field of a frame relay frame and sends it out to the frame relay network.

19 Claims, 21 Drawing Sheets

| FLAG | ADDRESS FIELD | FRAME RELAY DATA FIELD | FRAME CHECK SEQUENCE | FLAG |

FIG. 2

| LINE NO | DLCI | CALL NO | CIR | PRI L |
|---|---|---|---|---|
| | 0 | . | . | . |
| | . | . | . | . |
| 0 | 100 | 100 | 256 | 1 |
| | . | . | . | . |
| | 1023 | . | . | . |
| . | . | . | . | . |
| . | . | . | . | . |

| CALL NO | NODE | L S NO | CALL NO |
|---|---|---|---|
| . | . | . | . |
| . | . | . | . |
| 100 | 701 | 10 | 50 |
| . | . | . | . |
| . | . | . | . |

NETWORK CONTROL HEADER

FRAME BATCH DISCARD CONTROL WHEN A NON-PRIORITY FRAME IS RECEIVED

FRAME BATCH DISCARD CONTROL WHEN A PRIORITY FRAME IS RECEIVED

| 7 | 6 | 5 | 4 | 3 | 2 | 1 | 0 |
|---|---|---|---|---|---|---|---|
| DLCI (UPPER) | | | | | | C/R | EA |
| DLCI (LOWER) | | | | FECN | BECN | DE | EA |

FIG. 11A

| 9 | 8 | 7 | 6 | 5 | 4 | 3 | 2 | 1 | 0 |
|---|---|---|---|---|---|---|---|---|---|
| TR PRIORITY | | DISC PRIORITY | | | | | | | |

FIG. 11B

| | 4TH-L-PRI | 4TH-L-PRI | 4TH-L-PRI | 4TH-L-PRI |
|---|---|---|---|---|
| TR PRIORITY TABLE | 11 | 10 | 01 | 00 |
| DISC PRIORITY TABLE | 11 | 10 | 01 | 00 |

FIG. 11C

FRAME RELAY SWITCHING APPARATUS AND ROUTER

BACKGROUND OF THE INVENTION

1. Field of the Invention

The present invention relates to a frame relay communications system and, more particularly, to a frame relay switching apparatus with priority control for a frame relay communications system, which is capable of performing priority control and also minimizing discarded frames during the transfer of frames, by providing a type of frame assured committed information rate (CIR) for each data link connection identifier (DLCI), by providing an address field for each frame with a transfer priority and a discard priority of the frame, and by providing a common buffer, which can be shared by a plurality of line sets in a frame relay switching apparatus.

2. Description of the Related Art

The frame relay communications system achieves high-speed data transmission by adopting a significantly simplified data transmission procedure based on the X. 25 protocol used in the packet switching system, which is employed for data communication.

The digitized transmission lines, which are presently available, have led to higher reliability of the transmission lines and a lower rate of errors occurring in the transmission lines during data transmission. The need for interconnection of local area networks (LAN) has brought about the demand for faster data transfer.

Accordingly, a frame switching system is designed to leave re-transmission control to an inter-terminal check function when an error takes place so that a network is allowed to concentrate on high-speed data transfer.

FIG. 1 shows LANs connected through a frame relay network. Numeral 1 in the drawing denotes the frame relay network, which is made up of a plurality of frame relay switching apparatuses 10 and permanent virtual lines (PVCs), which interconnect the frame relay switching apparatuses 10. Routers 20 interwork LANs 30 through the frame relay network 1. Data link connections (DLCs) 20A connect the frame relay switching apparatuses 10 and the routers 20.

The routers 20 multiplex frames received from a plurality of terminals T on LANs 30 and send them out to DLCs 20A. A plurality of DLCs are generated in a single physical line 20B. The frame relay switching apparatus 10 identifies a destination of the frame received via a DLC by the DLCI on the address field in that frame and sends the frame out in the manner described later.

In such a configuration, a plurality of terminals compete in using the frame relay physical line. Generally, the level of a request for a real-time communication among the terminals T varies according to types of tasks using the communication. For instance, a quick response is required in a conversational application, wherein a person works through a keyboard, whereas a file transfer requires a high throughput but a low level of real-time response.

To meet such varied needs, the router 20 carries out a priority control over a frame when sending the frame out to the frame relay network 1, thus preferentially sending out data requiring a high level of real-time transfer.

Delay, however, takes place in the frame relay network 1, and carrying out only the priority control by the router 20 is not sufficient; therefore, it is necessary to carry out priority control also in the frame relay network 1.

The priority control involves the control of the discarding priority of frames as well as the priority of real-time transfer. For example, a high level of real-time operation must be set for voice data just as in conversational data communication; however, a partially interrupted conversation on a telephone does not prevent interpretation of the content thereof. Hence, for voice data, discarding partial data is more tolerable than that of data communication, so that voice data does not require as high a priority level for discarding frames than that of data communication.

FIG. 2 shows a frame format used in the frame relay network. The frame format starts with a flag field (F), which is followed by an address field (A), a frame relay data field (D), a frame check sequence (FCS), and a flag field (F) in the order in which they are listed.

Written in the address field A are a data link connection identifier (DLCI), a forward explicit congestion notification (FECN) bit, a backward explicit congestion notification (BECN) bit, and a discard eligibility indicator (DE) bit.

The DLCI in the frame is used as information for identifying the destination to which the frame is directed. A terminal tells the frame relay network 1 a destination through the DLCI. In this case, a single DLCI corresponds to a single destination; therefore, consecutively sending out frames having different DLCIs enables communication with a plurality of destinations through a single physical line.

When, for example, the service rate of a processor of the frame relay switching apparatus or the service rate of a buffer exceeds a predetermined reference value, it is determined that congestion has taken place in the network and the BECN and FECN report the occurrence of the congestion to a receiving terminal and a sending terminal, respectively.

The DE bit indicates that a frame carrying this bit may be discarded when congestion happens in the frame relay switching apparatus 10 in the network. The frames with the DE bits set specified value, for example DE=1, are discarded at first, when congestion occurs in the frame relay switching apparatus 10.

There are two cases wherein the DE bit is set to "1". In one case, a frame to be sent out is set to DE=1 at an originating terminal T from the start. In the other case, if data exceeding the volume of information established by a contract has flown into the frame relay switching apparatus 10, then the frame relay switching apparatus 10 sets the DE bit of the frame, which has flown in, to DE=1 and discards the frame, which has been set to DE=1, when congestion occurs later. In the state in which the congestion is increased to a higher level, even the frames with higher priority are also discarded.

Thus, the frame relay network 1 enables a high-speed data transfer, but data are unavoidably discarded when congestion takes place.

Such discarding of frames is not acceptable for some types of data. In the transfer of a computer program, for example, even a single discarded frame results in an incomplete program, possibly preventing proper operation of a computer. This has given rise to the demand for a frame relay priority control method, wherein no important data are discarded.

SUMMARY OF THE INVENTION

Accordingly, an object of the present invention is to solve the problem described above by providing a type of DLCIs, of which the frames are assured to be transferred at the committed information rate (CIR) to carry out the priority control, by carrying out the priority control over each multiplexed frame in the same DLCI, and by providing a common buffer, which can be shared by a plurality of line sets, to temporarily save a frame when congestion occurs. To fulfill the aforesaid object, there is provided a priority control method in the frame relay communication, the method including a step (1) for registering priority/non-priority for each DLCI in a frame relay switching control table in response to a report given by a terminal, a step (2) for determining the priority level of DLCI of a received frame by referring to the control table, and a step (3) for performing the priority control in accordance with the priority level of DLCI of the received frame.

The priority control method is carried out in the following manner. When the frame relay switching apparatus 10 receives a non-priority DLCI frame in a congested state, the received frame and all the frames having the same DLCI as the received frame in a transmitting buffer are discarded at the same time, thus preventing the frames with priority DLCIs from being discarded. When the frame relay switching apparatus 10 receives a priority DLCI frame in a congested state, all the non-priority frames in a transmitting buffer are discarded at the same time thus preventing the frames with priority DLCIs from being discarded.

In another aspect of the present invention, a particular bit in a bit area for indicating DLCI assigned to the address field of the frame is used as the bit for indicating transfer priority and discard priority.

The priority control processing on a frame basis is performed, the procedure of the processing including a step (1) for defining the priority control level and the processing by the frame relay switching apparatus in accordance with the defined priority control level, a step (2), wherein the router gives a frame received from a terminal a priority level by referring to the table in the router, a step (3) for determining the priority level of the frame received by the frame relay switching apparatus, and a step (4), wherein the frame relay switching apparatus performs the priority control in accordance with the priority level assigned to the received frame.

This allows the priority control to be implemented over every frame sent out by a terminal, permitting detailed priority control.

Further, there is provided a frame relay switching apparatus, which has a management processor for controlling a whole system, a communication multiplex unit having a plurality of line sets and a common buffer which a plurality of line sets can access, and a network supervising processor, which monitors the whole network.

According to the frame relay switching apparatus of the present invention when one of the line sets of the frame relay switching apparatus becomes congested, a frame received then is temporarily stored in the common buffer and the frame is taken out from the common buffer and sent out when the congestion has been resolved, thereby preventing the frame from being discarded.

BRIEF DESCRIPTION OF THE DRAWINGS

FIG. 2 is a frame format used in the frame relay network;

FIG. 11A is a diagram illustrating the configuration of the header according to the second embodiment of the present invention;

FIG. 11B is a diagram illustrating the configuration of the DLCI according to the second embodiment of the present invention;

FIG. 11C is a diagram illustrating the configuration of the priority management table according to the second embodiment of the present invention;

DESCRIPTION OF THE PREFERRED EMBODIMENTS

Figure 1:
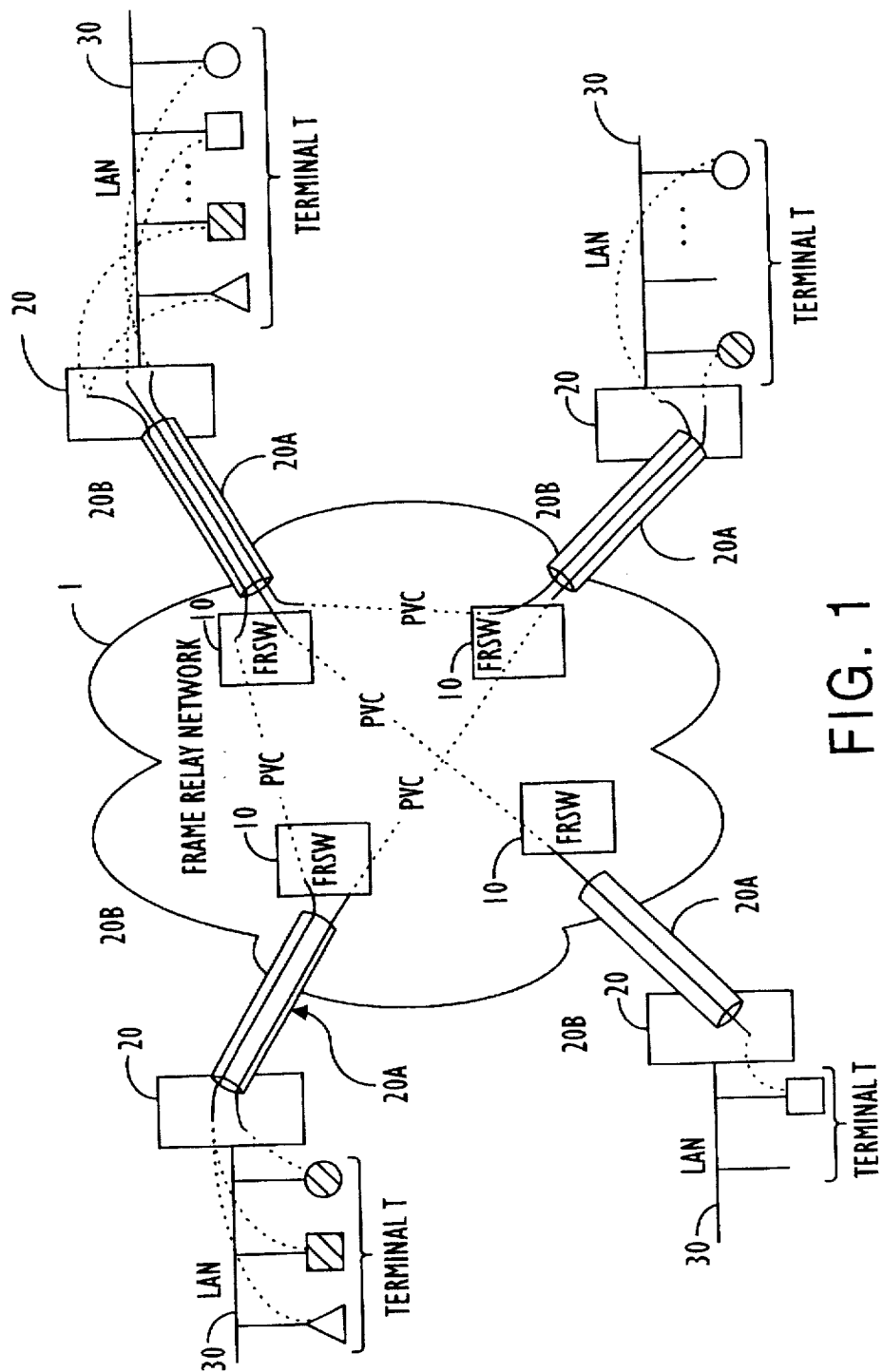
FIG. 1 is a diagram showing the LANs connected through the frame relay network.
Figure 3:
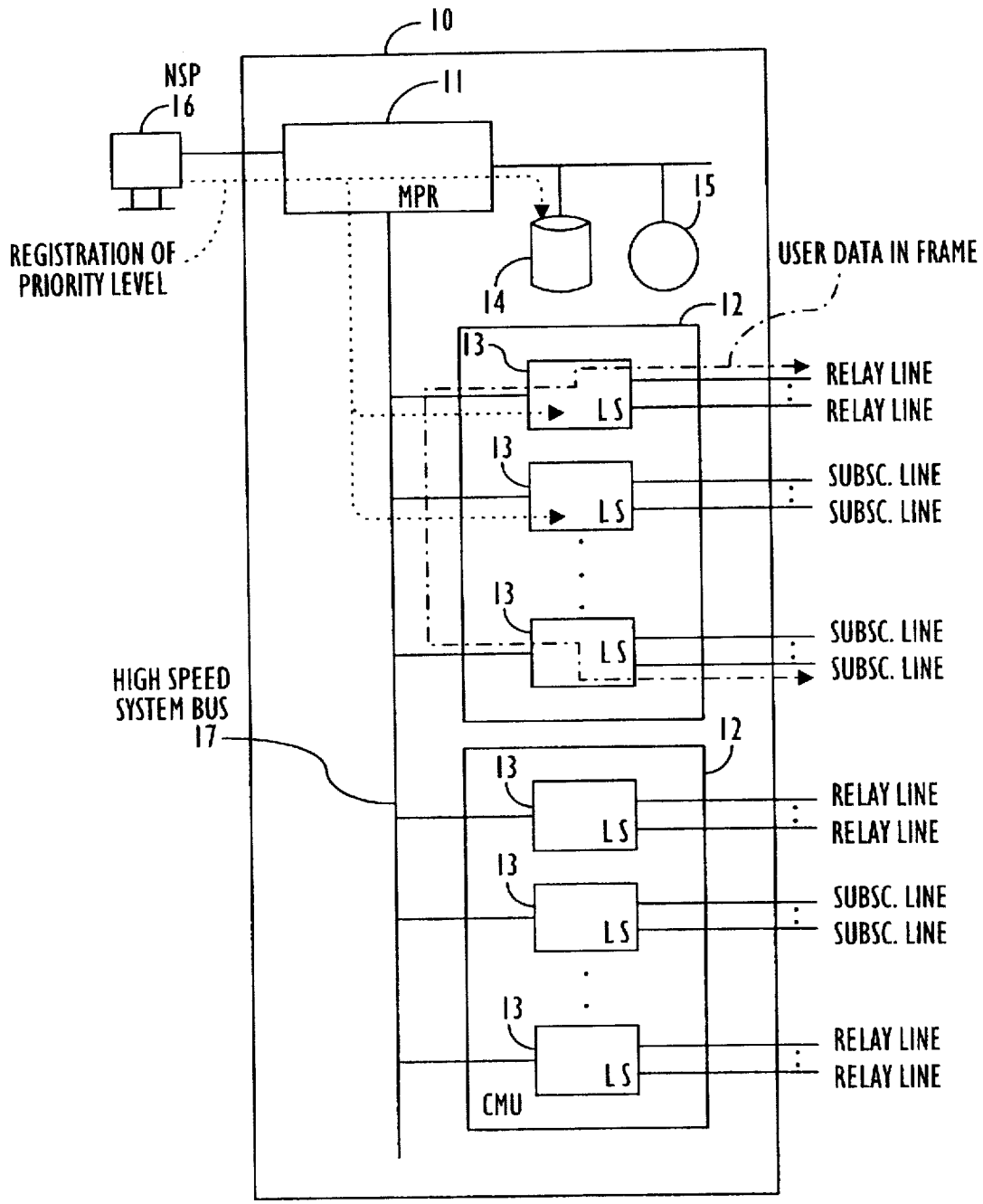
FIG. 3 is a block diagram illustrating the configuration of the frame relay switching apparatus.

First, the configuration of the frame relay switching apparatus 10 will be described with reference to FIG. 3. As shown in FIG. 3, the frame relay switching apparatus 10 includes a system management processing unit (MPU) 11, which controls the whole system, a communication multiplex unit (CMU) 12 incorporating a plurality of line sets (LS's) 13, a magnetic disk storage 14, a magnetic tape storage 15, and a network supervising processor (NSP) 16.

Each line set (LS) 13 is connected to a plurality of lines through which frames come in from or go out to subscriber terminals or another node for relaying.

Figure 4A:
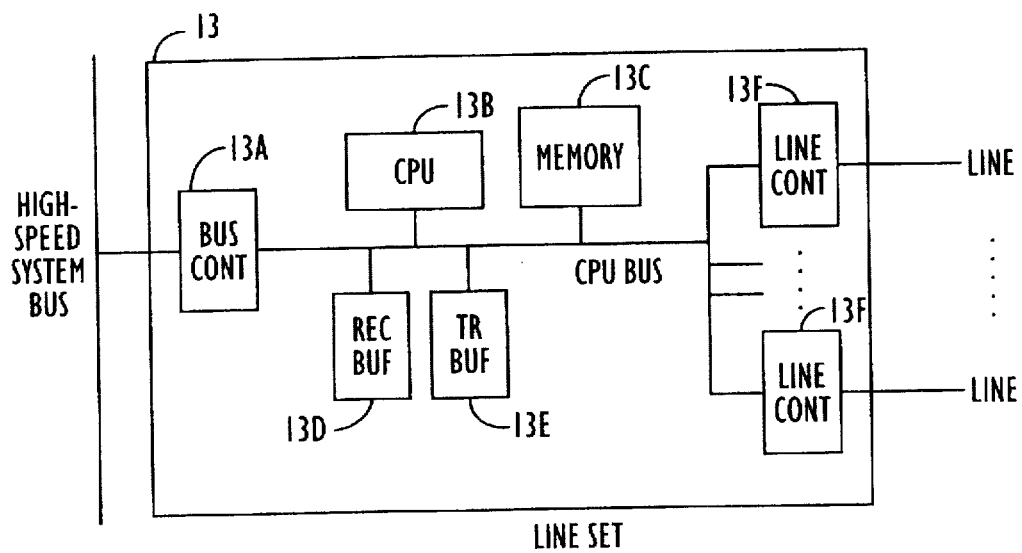
FIG. 4A is a block diagram illustrating the configuration of the line set.

FIG. 4A is the diagram illustrating the configuration of the line set. The line set 13 is connected to a high-speed system bus via a bus controller 13A. The central processing unit (CPU) 13B carries out switching in accordance with a program written in a memory 13C and sends out a received frame to a specified line.

A receiving buffer 13D is a buffer memory for temporarily storing a received frame from its line, and a transmitting buffer 13E is a buffer memory for temporarily storing a frame to be transmitted to its line.

A line controller 13F is provided between a CPU bus and each line.

Figure 4B:
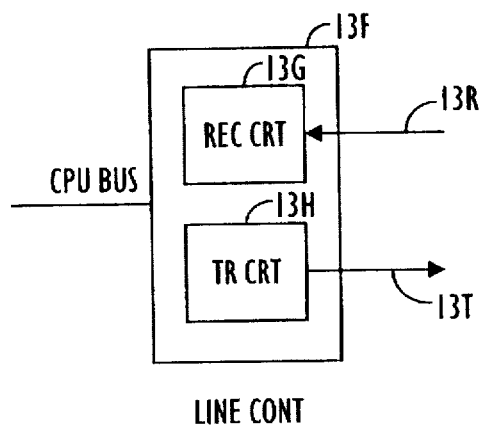
FIG. 4B is a block diagram illustrating the line controller.

FIG. 4B is a diagram illustrating line controller 13F of FIG. 4A. Line controller 13F is provided for each line and includes a receiving circuit 13G for receiving frames from receiving channel 13R and a transmitting circuit 13H for transmitting frames to transmitting channel 13T and it performs line control when a frame is transmitted or received.

Figure 5A:
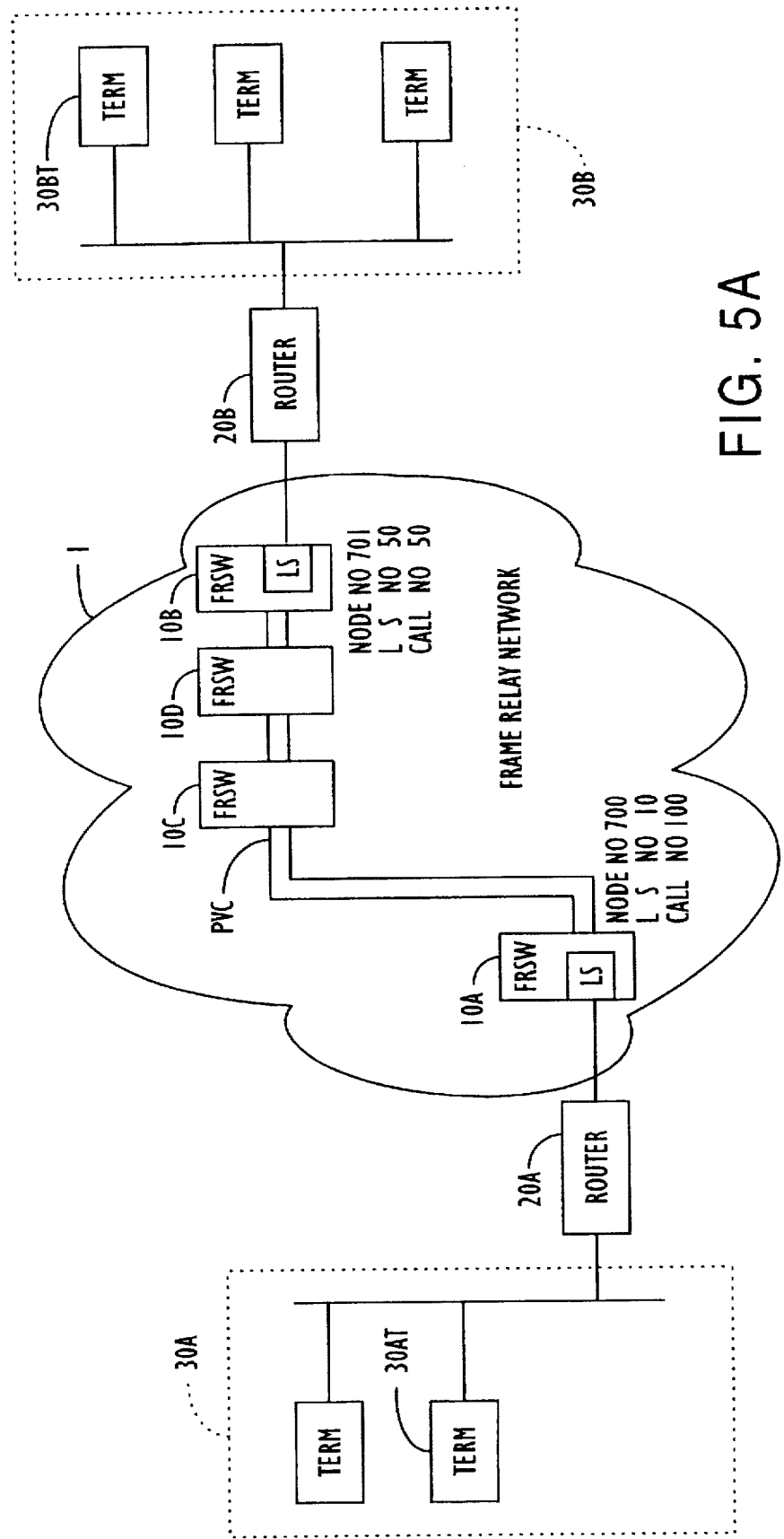
FIG. 5A is a block diagram illustrating the connections in the frame relay network.

FIG. 5A is a diagram illustrating the connection procedure of the frame relay network, whereby the frame relay switching apparatus 10A having Node Number 700 communicates to another frame relay switching apparatus 10B having Node Number 701 via two relaying nodes 10C, 10D.

Before the terminal 30AT communicates with terminal 30BT, it is necessary that the registration of each terminal to each frame relay switching apparatus be obtained.

Before the terminal 30AT connected to the node 10A communicates with terminal 30BT connected to the node 10B, it is necessary to provide the registration of connecting information for identifying the call and for establishing the connection, to the frame relay network. Each frame relay switching apparatus has PVC CONTROL TABLE and DLCI CONTROL TABLE in each line set for executing the connection.

Figures 5B, 5C, 5D:
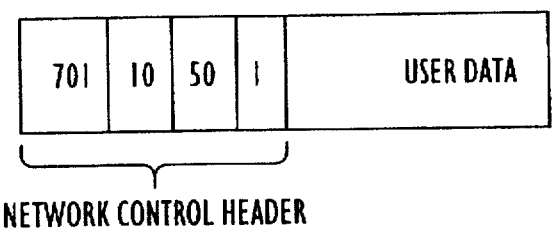
FIG. 5B is a diagram illustrating the configuration of the DLCI control table.
FIG. 5C is a diagram illustrating the configuration of the PVC control table.
FIG. 5D is a diagram illustrating the configuration of the intra-network frame.

The connecting information for call identifying consists of the number of a physical line to which the terminal is connected, the number of DLCI for identifying incoming frame, call number and committed information rate 256 kbps(CIR) committed to the call and the priority level attached to the DLCI (as shown in FIG. 5B). This information is registered to the DLCI control table of the respective line set via the network supervising processor (NSP) 16 and the system management processing unit (MPU) 11.

FIG. 5B shows the configuration of DLCI control table for the connection shown in FIG. 5A. By referring to this table, the frame received from the No. 0 line, having DLCI "100" is identified as a frame for communication of call number "100" at the node 10A.

The information for PVC establishing is also needed to be registered to the PVC control table beforehand.

This information consists of the destination node number, the call number and the line set number, to be used in the arriving side node. FIG. 5C shows the configuration of PVC control table registered in the originating node (701) for the connection shown in FIG. 5A. After registration, when terminal 30AT connected to line number 0 and DLCI number 100 calls terminal 30BT connected to node 701, the frame relay switching apparatus finds call number 100 by referring to the DLCI control table. This call number is used for finding the destination side information, such as node number 701, line set number 10, call number 50, for referring to the PVC control table. Then the originating node 10A assembles intra-network frame (shown in FIG. 5D) by adding network control header including the information for destination node such as 701,10,50,1 (the last numeral is an identifier for priority level of the frame) to user data and sends it out to the next node, as shown in FIG. 5D. After that, the relaying node which receives this intra-network frame from the preceeding node through a relay line, decides the next node referring network control header and sends the frame to a following node.

The destination node recognizes the frame to itself, decides line set number 10 and DLCI number, terminal 30BT referring its DLCI control table in line set number 10, and the desination node sends the frame relay frame assembled from the received intra-network frame to terminal 30 BT.

In FIG. 5B, PRI L means PRIORITY LEVEL for transfer priority control and discard priority control which is newly introduced in the present invention and will be explained later.

Figure 6:
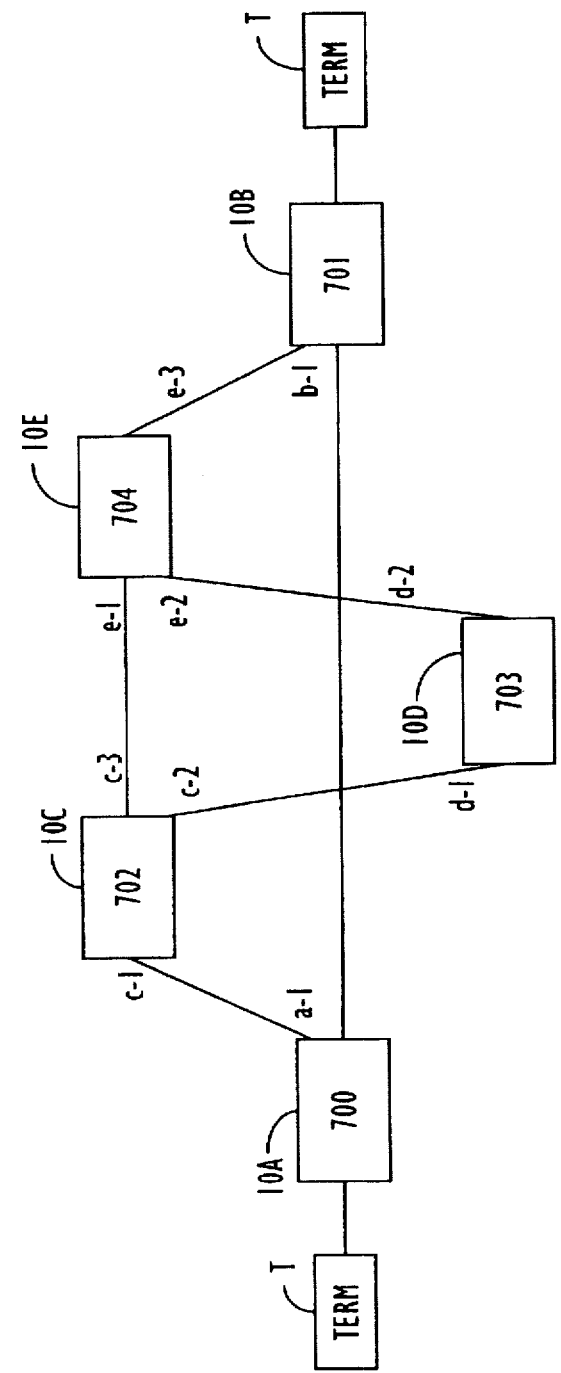
FIG. 6 is a block diagram illustrating the inter-node connection in the frame relay network.

FIG. 6 is the block diagram illustrating the inter-node connection in the frame relay network. In FIG. 5A, only one route is shown from the origination node 10A to the destination node 10B, but generally there exist a plurality of routes from one node to another node.

FIG. 6 shows a frame relay network which consists of a plurality of frame relay switching apparatuses or nodes 10A,10B,10C,10D,and 10E (Node number are 700,701,702, 703, 704 respectively). Each node has a ROUTING TABLE for finding routes to the destination node identified in the intra-network control header in the received frame. When the frame relay switching apparatus 10A sends a frame to the frame relay switching apparatus 10B, the frame relay switching apparatuses or relay nodes 10C, 10D refer the network control header received from the line to the respective routing table for recognizing the destination node 10B, and decides a route for sending out the received frame.

In the frame relay communications system, the frame relay switching apparatus determines DLCI on the receiving side by referring the originating-side DLCI of the received frame to the line control table, and then transmits the frame to a specified destination terminal.

Such registration of DLCI is implemented by operating the NSP 16 (FIG. 3) in response to a subscriber's request and writing it in the line control table in the memory 13C of the line set 13.

The first embodiment relates to the frame relay communications system, which performs communication with a decided destination terminal according to such DLCI. A priority level is assigned to DLCI so that the frames with non-priority DLCIs are discarded when congestion happens, thus protecting the frames with priority DLCIs from being discarded.

The memory 13C in the line set 13 shown in FIGS. 4A and 4B stores a DLCI control table 13C1 (FIG. 9) for each line based on a request from a subscriber in addition to a program for operating the processing unit 13B. As already explained in connection with FIG. 5B, the DLCI control table includes (1) a line number, (2) DLCI number, (3) DLCI connection information (call number), and (4) CIR corresponding to DLCI of a terminal. In the present invention, (5) an identifier to denote the priority level attached to each DLCI has been added to the above four items.

A subscriber terminal which wants to communicate with another terminal applies, with necessary information including a data rate to be used, to the network for establishing a permanent virtual connection between both terminals in the frame relay network.

The sum of the data rate of multiplexed frames carried by a relay line or a subscriber line can not exceed the maximum transmission capacity of each physical line, so that the registration of a requested connection is admitted only if sufficient data rate on each of physical line (subscriber line and relay line) is available to support that connection.

If the application for registration is admitted, the requested data rate is called the committed information rate (CIR).

Figure 7:
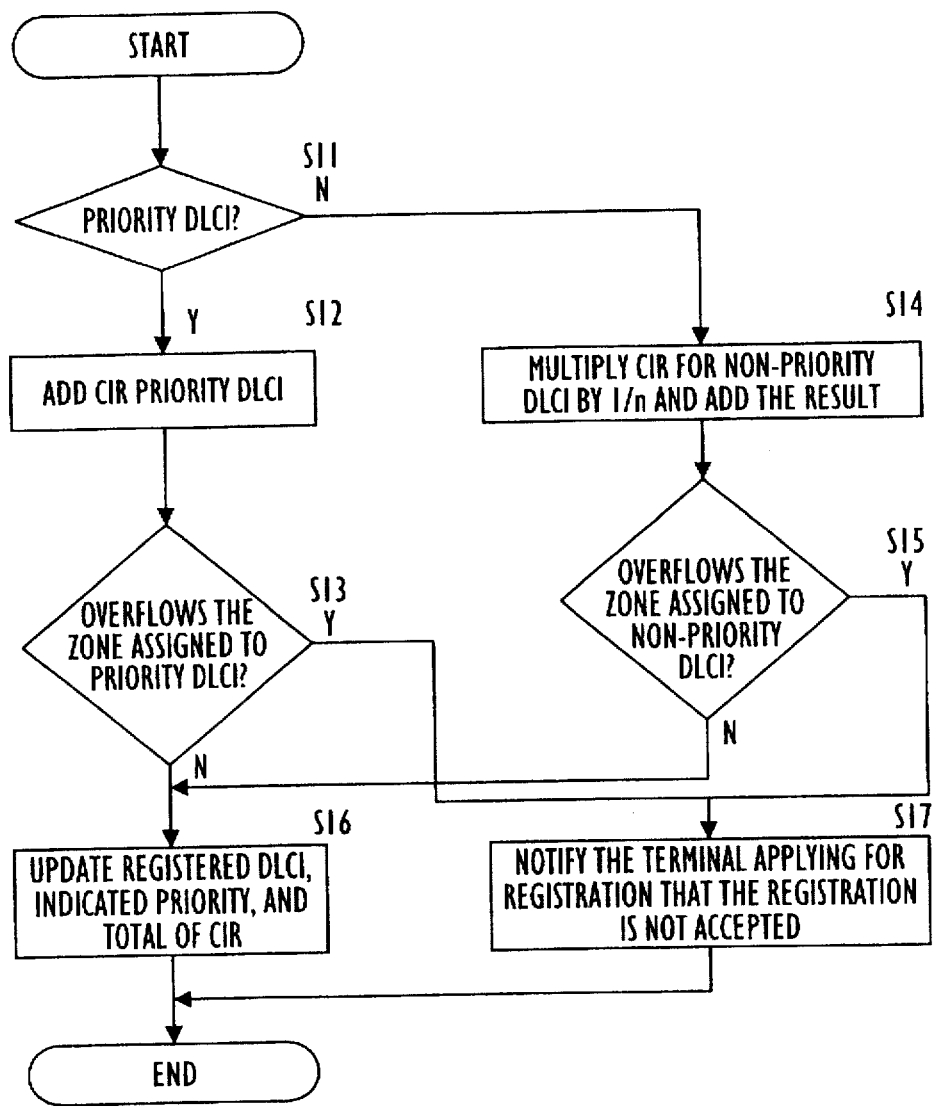
FIG. 7 is a flowchart of registering priorities of DLCIs according to a first embodiment of the present invention.

FIG. 7 is a flowchart for registering the priority levels of DLCIs according to the first embodiment of the present invention.

This procedure is carried out at the time when a subscriber requests the network for a registration of a new DLCI with a necessary information rate.

In S11, it is determined whether a DLCI to be registered is a priority DLCI, from the information about the subscriber's terminal. In S12, if the DLCI is a priority DLCI, then the committed information rate (strictly will be committed) is used for decision criteria in registering and is added to the sum of CIRs of DLCIs already registered. In S13, it is determined whether the total sum of CIRs of the priority DLCIs overflows the transmission capacity (data rate) assigned previously to the priority DLCI type. In S14, if the DLCI to be registered is a non-priority DLCI, then committed information rate for this is multiplied by 1/n for use as decision criteria and the result is added to the accumulated multiplied CIRs of already registered non-priority DLCIs, whereon 1/n is multiplication factor (usually 5~10 is used as n) under consideration that the frame having non-priority DLCI is eligible for discarding. In S15, it is determined whether the total sum of the CIRs of the non-priority DLCI overflows the data rate assigned to the non-priority DLCI. In S16, if the data rate allocated to the priority DLCI or non-priority DLCI is not overflown, then the requested DLCI is registered, the priority or non-priority indication is given, and the total sum of CIR is updated. In S17, if the total sum of CIRs of the priority DLCI or non-priority DLCI in S13 or S15 overflows the date rate assigned to the priority DLCI or non-priority DLCI, the new registration is rejected, then the terminal, which has applied for the registration is informed that the registration is not accepted.

Figure 8:
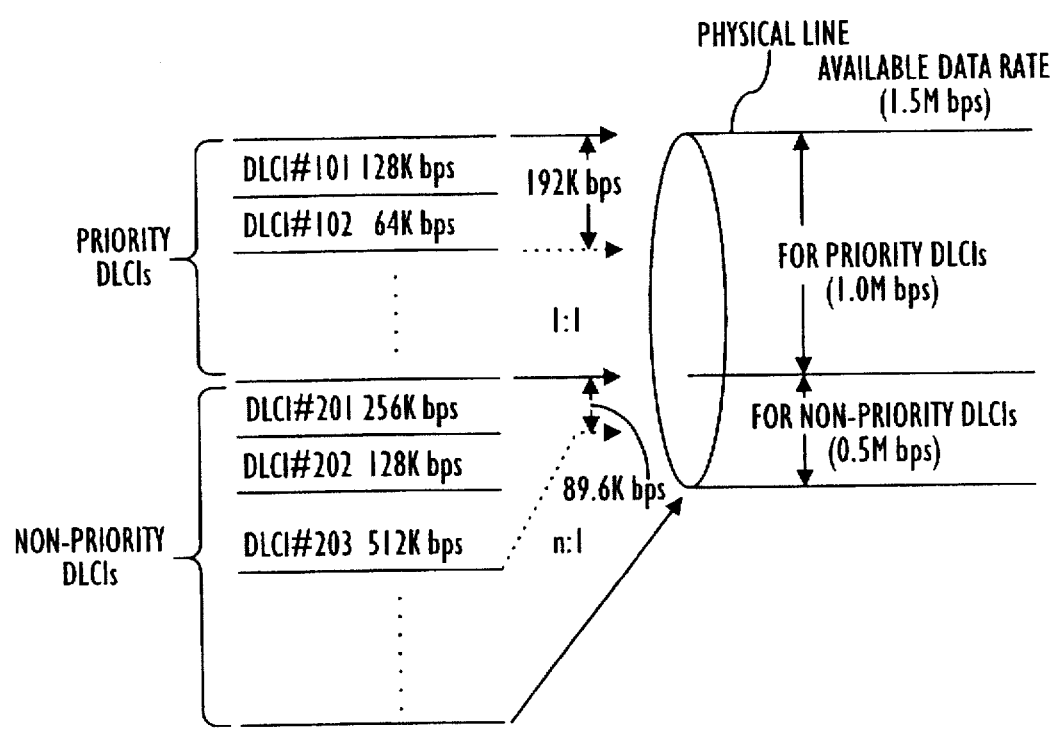
FIG. 8 is a diagram illustrating the relationship between the committed CIRs and the assumed CIRs according to the first embodiment.

FIG. 8 illustrates the concept of the CIR registration considering the transmission capacity for priority DLCIs and non-priority DLCIs according to the first embodiment. In the drawing, the total transmitting capacity (available data rate) of the physical line (for example 1.5M bits per second) is divided into two zones, i.e., a capacity to be used for priority DLCIs (for example 1M bits per second) and a capacity to be used for non-priority DLCIs (0.5M bits per second). The committed information rate is assigned one-to-one to a priority DLCI, while it is assigned n-to-one to a non-priority DLCI. That is, in this example, the total sum of already assigned CIRs for priority DLCIs is 192 Kbps, while the total sum of CIRs of already registered non-priority DLCIs is assumed to be 89.6 Kbps, which value is under-estimated compared with the real sum of 896 Kbps through the multiplication factor n=10.

This means that non-priority DLCIs can be registered until the total sum of requested data rates reaches the value of ten times assigned capacity for non-priority DLCIs. Under a condition with no congestion taking place, communication in the network can be performed without discarding any non-priority DLCI frames, but when congestion occurs, the frames with non-priority DLCIs will be discarded. This processing prevents the frames with priority DLCIs from being discarded, allowing them to be preferentially transferred.

Figure 9:
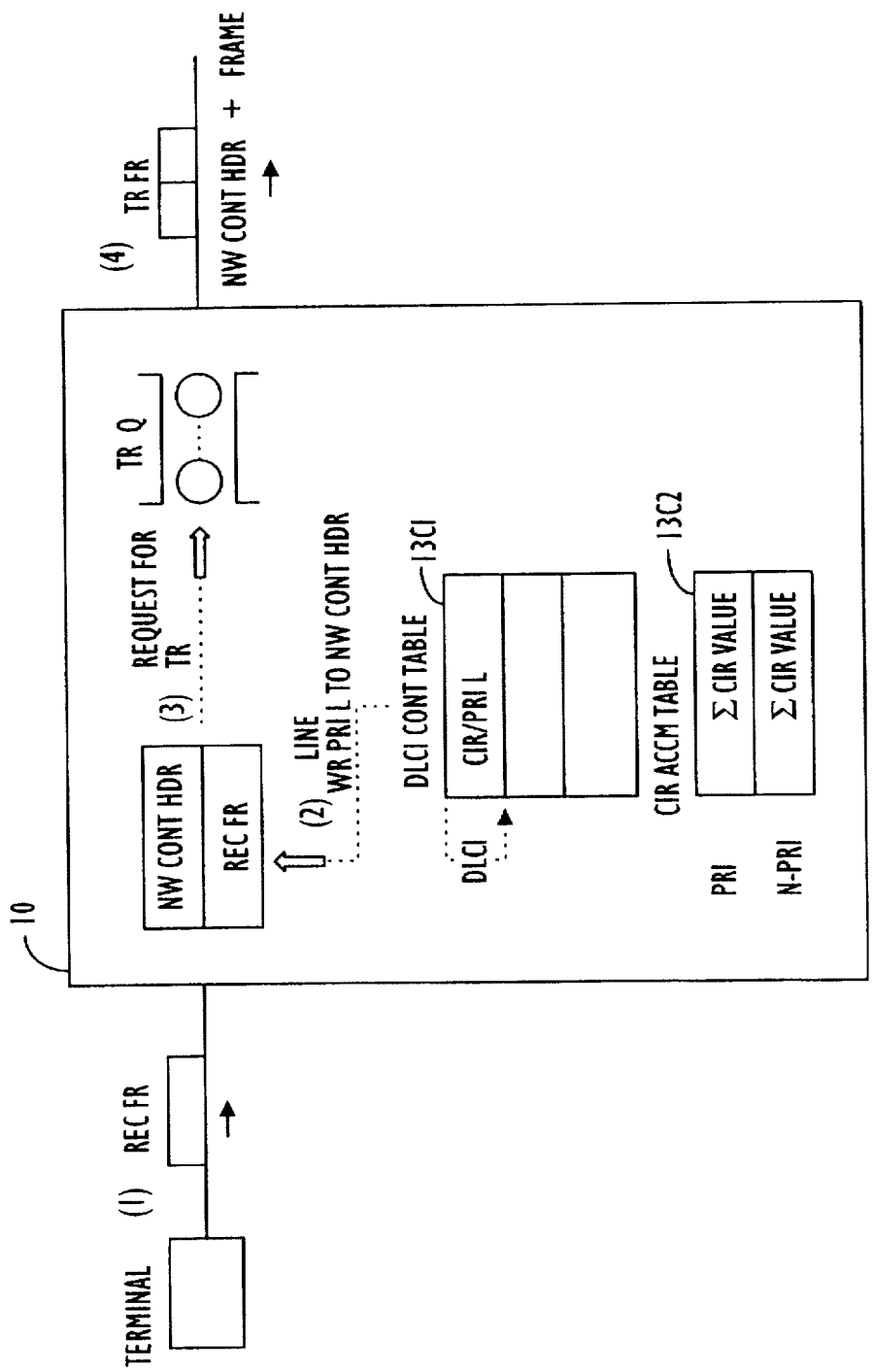
FIG. 9 is a diagram illustrating illustrates priority/non-priority control according to the first embodiment.

FIG. 9 illustrates the priority/non-priority control when a call is generated. In accordance with the procedure shown in FIG. 7, each DLCI is checked beforehand whether it is a priority DLCI or a non-priority DLCI and the check result is registered in a DLCI control table 13C1 of the memory 13C of the frame relay switching apparatus 10. Written in a CIR accumulating total table 13C2 are the total sums of the committed information rates of the priority DLCIs and the non-priority DLCIs, the table being referred to when registering DLCIs.

Under this condition, in step (1), the frame relay switching apparatus 10 receives a frame with a particular DLCI through a particular subscriber line. In step (2), the processing unit 13B of the corresponding line set 13 refers to the DLCI control tables 13C1 corresponding to the particular line in order to obtain priority level and destination information for the frame and writes obtained priority level and destination information in the network control header which is attached to the head of the received frames. In step (3), the processing unit 13B writes the received frames in the transmitting buffer 13E in the order of a transmission queue. In step (4), the network control header with priority level and the user data are sent out to the line for the next node as intra-network frame.

Figure 10A:
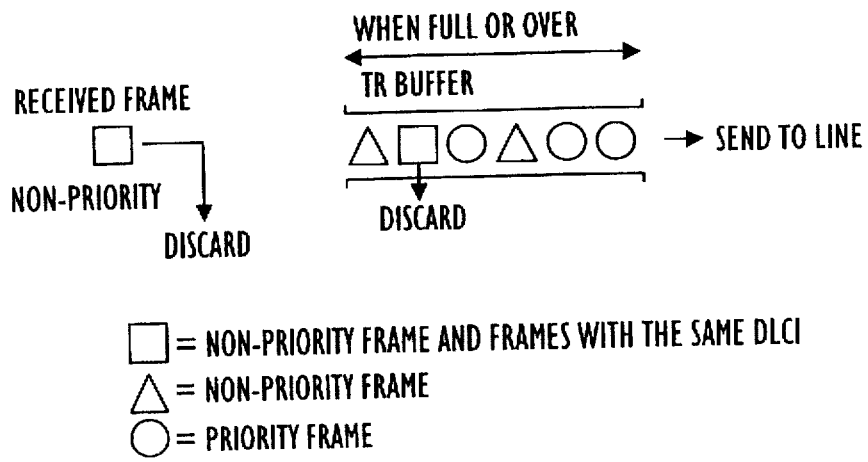
FIG. 10A is a diagram illustrating buffer control when non-priority DLCI is received.
Figure 10B:
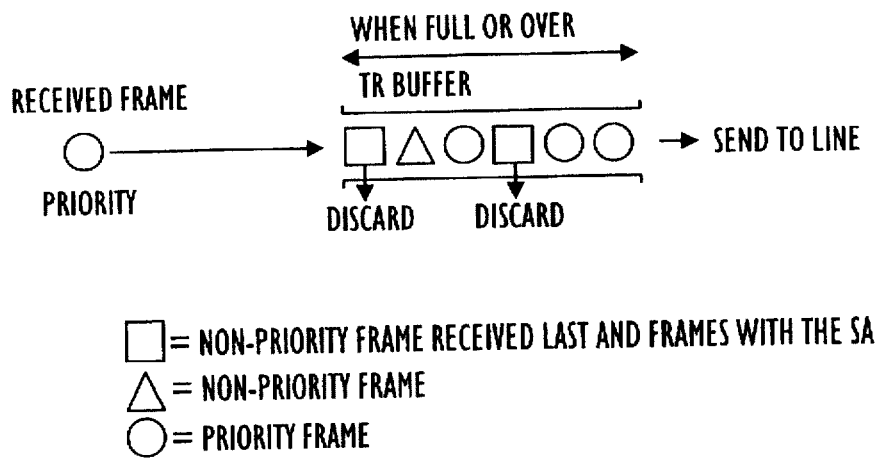
FIG. 10B is a diagram illustrating buffer control when priority DLCI is received.

FIGS. 10A and 10B illustrate the buffer control according to the first embodiment. FIG. 10A shows the frame batch discarding control when a non-priority frame is received. Transmission data are written in the transmitting buffer 13E in the frame relay switching apparatus 10. At this time, in order to check for congestion in the transmitting buffer 13E, the processing unit 13B compares the number of frames in the transmitting buffer 13E with a threshold value for determining congestion. If the number of the frames in the transmitting buffer 13E exceeds the threshold value, then the processing unit determines that the congestion has occurred.

Under this condition, when the processing unit 13B receives a frame, it identifies whether the frame is a priority or non-priority frame from the DLCI thereof, and if it turns out to be a non-priority frame, then it discards the received frame and a frame having the identical DLCI to that of the received frame, which has already been written in the transmitting buffer 13E.

FIG. 10B shows the frame batch discarding control when a priority frame is received. When a received frame is a priority frame, the processing unit discards a frame having a non-priority DLCI, which has been written in the transmitting buffer 13E and which has been received last, and it writes the received priority frame in the transmitting buffer 13E.

In case of congestion, such processing discards the frames with non-priority DLCIs at a time, thereby assuring the transfer of the frames with priority DLCIs.

While the first embodiment of the present invention establishes the priority level for each DLCI to perform the priority control, the second embodiment establishes the priority level for each frame with an identical DLCI to perform the control.

For instance, when inter-LAN communication is implemented through the frame relay network, the same DLCI is given to the data received from a plurality of terminals, which are held in the same LAN, and the data are sent out onto the same data link. In this configuration, the priority levels of a plurality of terminals on the same LAN are not always identical, i.e., the priority levels differ, depending on the terminal or the application thereof. Hence, it is necessary to give each frame a priority level even in the same DLCI in order to carry out the control.

The priority level assigned to each frame is decided from a LAN address and the protocol thereof, referring to a table provided in the router, when the router assembles LAN data as a frame relay frame, then the priority level is sent out to the frame relay network 1. The frame relay switching apparatus identifies the priority level of a received frame and executes the priority control specified by the priority level.

The configuration of the frame used in the frame relay communication is as illustrated in FIG. 2; the destination is identified by the DLCI in the address field to perform communication.

FIG. 11A shows the configuration of the address field of the frame relay frame. The address field consists of 2 octets (16 bits), 10 bits being allocated to DLCI therein, 1 bit each being assigned to FECN, BECN, and DE, respectively, which are described above, 1 bit being allocated to a command/response indicator bit C/R (not used in the frame relay), and 1 bit being used as an address field extension indicator bit EA for each octet. EA=0 indicates that there is extension, while EA=1 indicates that there is no extension. In this ease, the address field consists of 2 octets, the second octet being EA=1.

The DLCI consists of 10 bits as illustrated; therefore, the number of DLCI can be registered in 0 up to 1023. In the actual operation of the frame relay switching apparatus 10, it is hardly considered that 1024 DLCIs must be established for a single line. Therefore, in the second embodiment of the present invention, the address field is configured so that a particular bit among the 10 bits of the DLCI is used as the bit for carrying out the priority control.

FIG. 11B shows the configuration of DLCI according to the present invention. In the second embodiment of the present invention, four bits out of the 10 bits of the DLCI are used as the priority control bits, the remaining six bits being used for the DLCI.

In the drawing, the layout of the priority control bits is as the upper 2 bits being used as the transfer priority control bits and the following 2 bits being used as the discard priority control bits.

For instance, when communication is performed between the LANs 30 through the frame relay network 1, routers 20 are provided between the LANs and network. The router is provided with a table for setting the aforesaid priority level from an address on the LAN 30 for each terminal T and an application being implemented and it establishes the transfer priority level and the discard priority level in the address field by referring to the table.

FIG. 11C shows the configuration of the priority control management table installed in the frame relay switching apparatus for carrying out priority control. In this invention, the transfer priority control uses 2 bits and the discard priority control uses 2 bits. The control can be carried out in four levels, the transfer or non-discard priority level being established in the descending order of "11," "10," "01," and "00."

Figure 12:
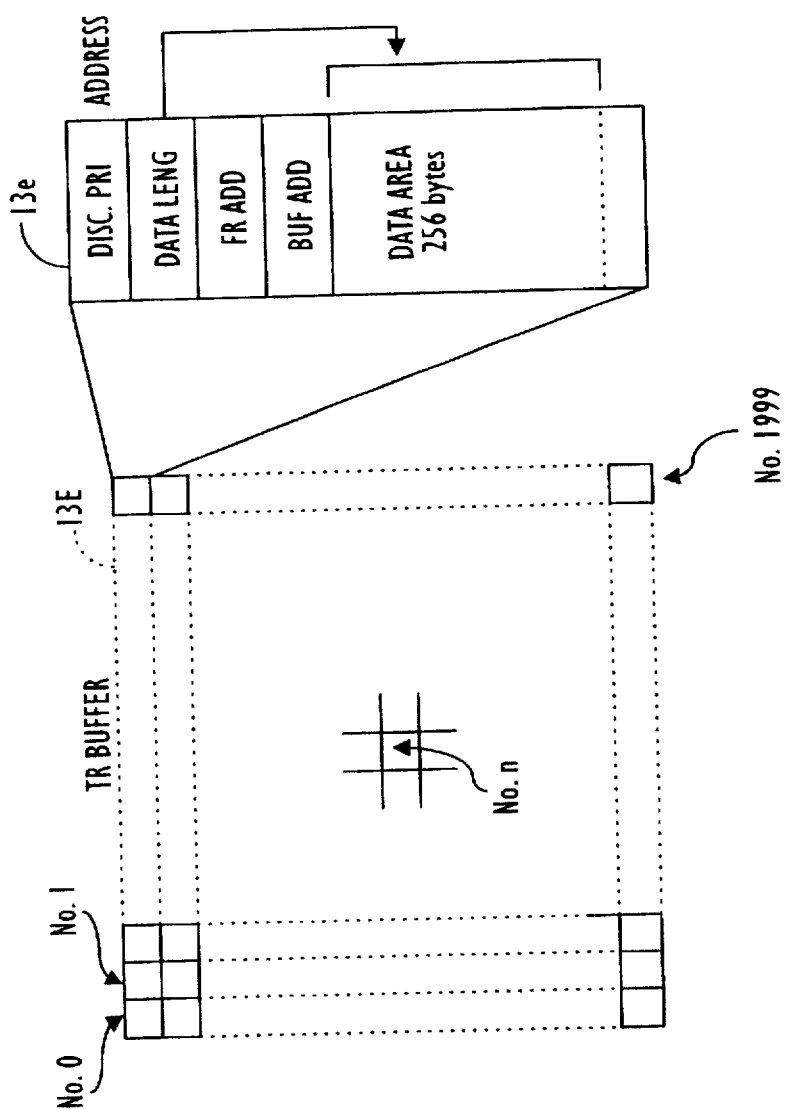
FIG. 12 is a diagram illustrating the configuration of the transmitting buffer according to the second embodiment.

FIG. 12 illustrates the configuration of the transmitting buffer in the priority control arrangement according to the second embodiment. The frames to be sent out to a relay line and subscriber line from the frame relay switching apparatus 10 are stored in the transmitting buffer 13E provided for each line in the line set 13 and transferred in sequence to the line controller 13F, starting with a frame stored first.

The priority control related to the transfer is accomplished by carrying out the transfer processing in accordance with the priority level when data is transferred from the transmitting buffer 13E to the line controller 13F. To be more specific, the transmitting buffer 18E dealing with the transfer priority has four transmitting buffers 13E since there are four levels of priority in this case. The processing unit 13B identifies the transfer priority level written in the address field of a received frame and writes the frame in the transmitting buffer 13E for corresponding transfer priority level.

The processing unit 13B implements the transfer priority control by controlling the frequency of reading the frames from the transmitting buffers 13E corresponding to the four transfer priority levels.

FIG. 12 shows an example, wherein the transmitting buffer 13E is made up of 2,000 unit buffers 13e. Each unit buffer 13e has the discard priority (DISC. PRI), effective data length (DATA LENG), the head address of the following frame (FR ADD), the address of the following unit buffer (BUF ADD), and a 256-kbyte data area as illustrated.

The transmitting buffer 13E is divided into four types corresponding to the priority levels, to control the transfer priority. The buffer control table for controlling the transmitting buffer 13E is provided in the memory 13C. Written in the buffer control table are flags showing the availability of the unit buffers 13e and addresses for specifying the unit buffers on the memory 13C.

Figure 13:
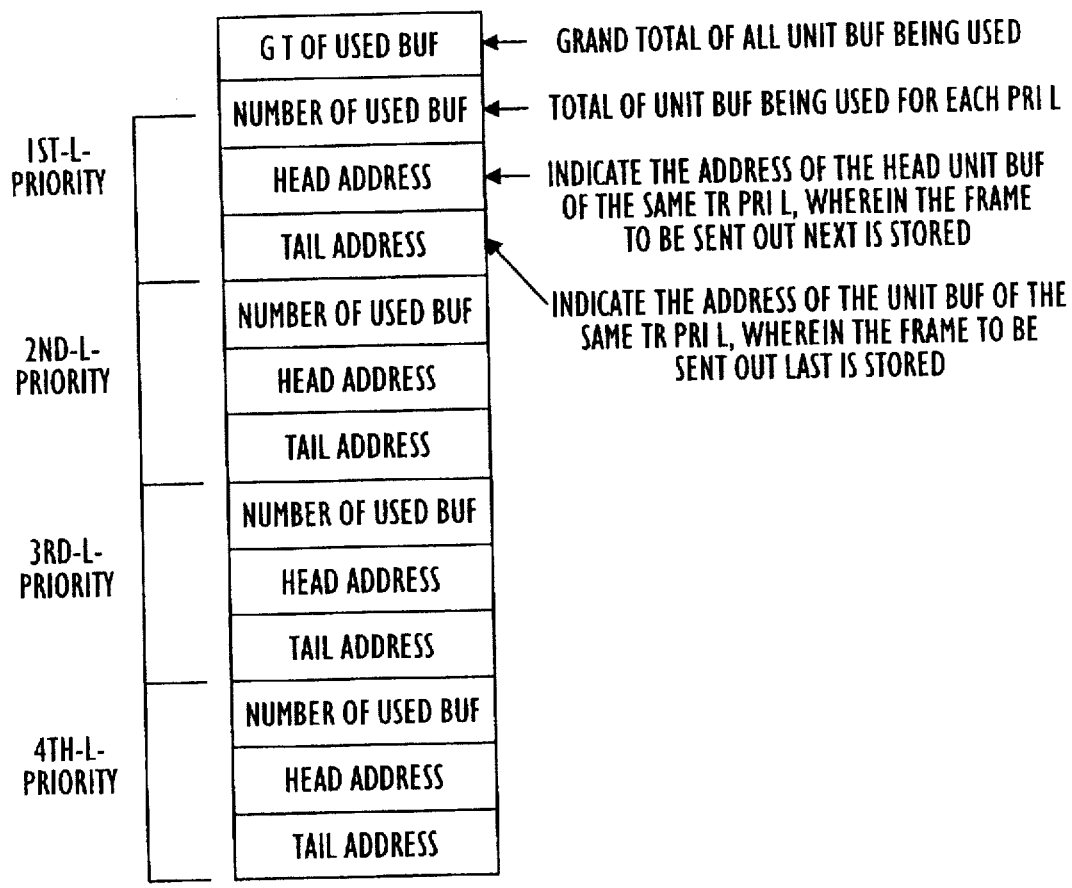
FIG. 13 is a diagram illustrating a transmission control table according to the second embodiment.

FIG. 13 illustrates the transmission control table of the priority control arrangement according to the second embodiment. In this invention, the transfer priority is divided into four levels, from the first to fourth levels.

The transmission control table is used to control the transfer from the four types of transmitting buffers 13E, which correspond to the four levels of priority. Written in the beginning of the table is the grand total of the unit buffers being used in all the priority levels, the total of the unit buffers being used as the transmitting buffer 13E for each priority level, a head address indicating the address of the starting unit buffer 13e, wherein the frame to be sent out next at the same transfer priority level is stored, and a tail address indicating the address of the unit buffer 13e, wherein the frame to be sent out last at the same transfer priority level is stored. Thus stored frames are managed on the transmission control table according to priority level thereof.

Figure 14:
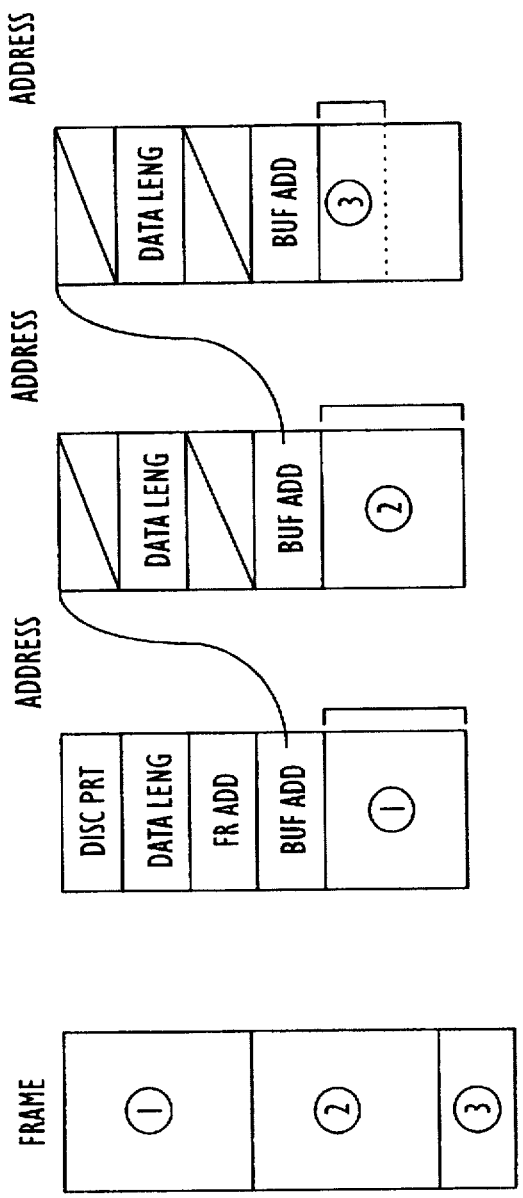
FIG. 14 is a diagram illustrating buffer chaining according to the second embodiment.

FIG. 14 illustrates the chaining of the unit buffers according to the second embodiment. The frames of user data, which have been switched in the frame relay switching apparatus 10, are stored in the transmitting buffer 13E In this embodiment, the data area of the unit buffer 13e is set to 256 kbytes; therefore, if the frame of user data exceeds 256 kbytes, then the frame cannot be held in a single unit buffer 13e. Hence, one frame is divided up and stored in more than one unit buffer 13e.

In FIG. 14, when the data of a user data frame consists of three areas shown (1), (2), and (3) ((1) and (2) have 256 kbytes, respectively), the data is divided into (1), (2), and (3) in the units of 256 kbytes and they are separately stored in the three unit buffers 13e. The address of the unit buffer 13e, wherein the following data is stored, is written in the column of the next buffer address (BUF ADD).

Even when a single frame is divided up and written in a plurality of unit buffers 13e in the above mentioned way, if the column of the next buffer address gives specification, the single frame, which has been divided up and stored in a plurality of unit buffers 13e, can be sent out by continuously sending out the unit buffers 13e involved.

Figure 15:
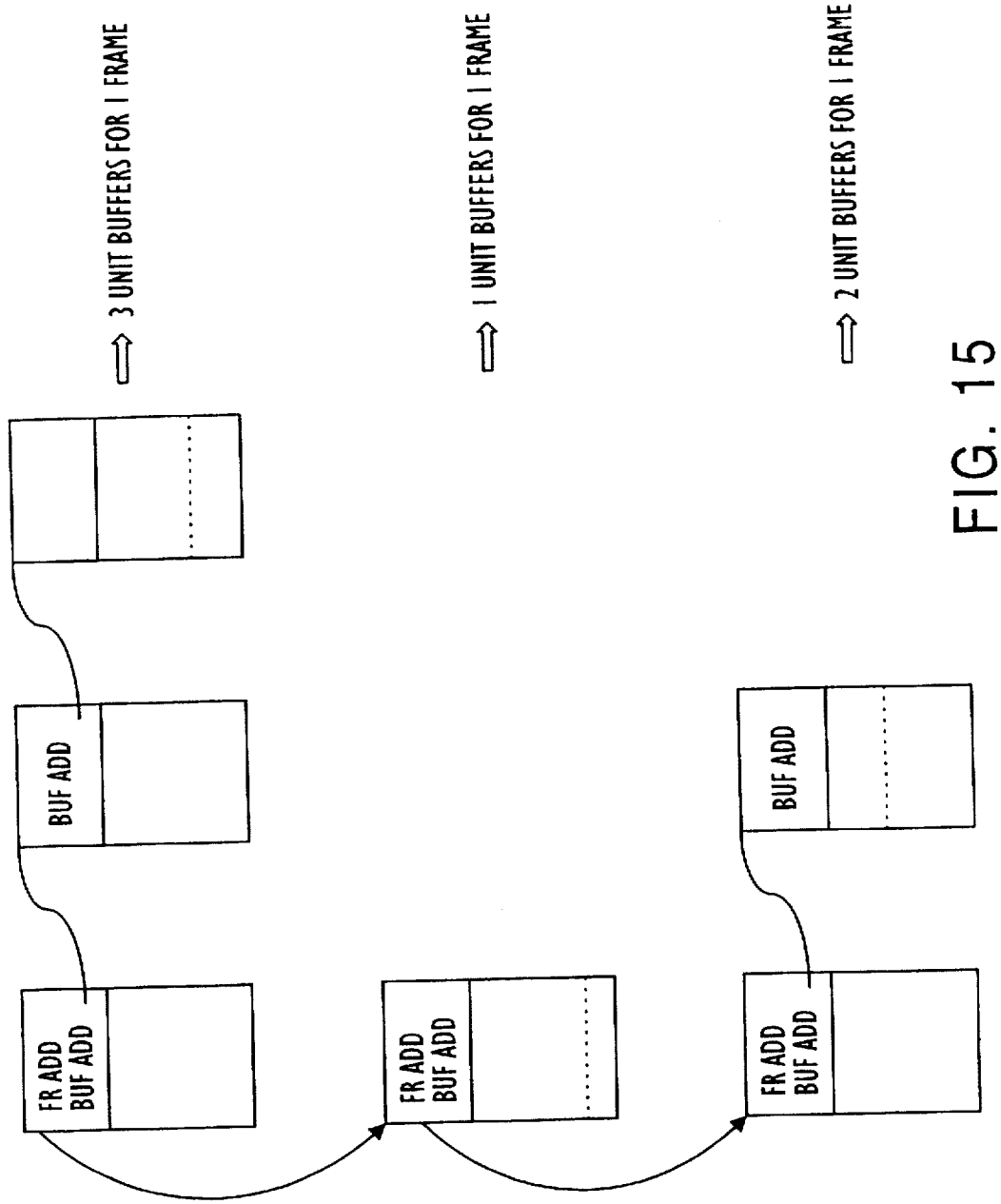
FIG. 15 is a diagram illustrating frame chaining according to the second embodiment.

FIG. 15 illustrates the chaining of frames in the arrangement according to the second embodiment. The number of in-use unit buffers of the transmitting buffer 13E is written in the transmission control table for each priority level as illustrated in FIG. 13. Therefore, whenever a new frame is to be stored in the transmitting buffer 13E, a required number of unit buffers 13e is secured, referring to the buffer control table. More specifically, the buffer control table is scanned and the flags for available unit buffers 13e are changed to indicate that the unit buffers are now in use, then the addresses of the respective unit buffers 13e are obtained. The number of secured unit buffers 13e is added to the total number of unit buffers in use and to the number of buffers in use for corresponding priority level on the transmission control table.

Then, referring to the tail address of corresponding priority on the transmission control table, the next frame address in the unit buffer 13e indicated by the tail address is changed to the address of the head unit buffer into which the new frame is to be stored.

Likewise, the tail address on the transmission control table is updated to the address of the head unit buffer into which the new frame is to be stored.

Thus, by storing frames in the transmitting buffer 13E, the frames in the unit buffers 13e can be all chained for control as illustrated in FIG. 15.

The frames from the transmitting buffer 13E thus configured can be transmitted in the following procedure.

The processing unit 13B of the line set 13 transfers the data section of the unit buffer 13e indicated by the head address on the transmission control table to the transmitting circuit 13H. The head address in the transmission control table is updated to the next frame address in the transmitting buffer 13E because of the subsequent frame.

If the next buffer address has been written in the unit buffer 13e specified by the head address, then the specified next unit buffer is also transferred in succession.

The unit buffer 13e, which has completed the transfer, is released by changing the indication of the availability flag on the buffer control table from "unavailable" to "available."

The frame transfer starts with the unit buffer 13e specified by the head address. When the data of the unit buffer 13e specified by the next address has been transferred and the unit buffer having no next address has been transferred, the transfer of one frame is completed.

The transfer priority control can be easily implemented by controlling the frame transfer from the transmitting buffer 13E, which is managed to correspond to the respective transfer priority levels, to the transmitting processor 13H. Specifically, the priority control can be accomplished by changing the ratio of the transfer of frames from the transmitting buffer 13E to the transmitting processor 13H in accordance with the transfer priority level.

In the transmission processing, when the transfer of a frame from the transmitting buffer 13E to the transmitting circuit, 3H is completed, the transfer of the following frame is begun. The processing unit 13B first refers to the transmission control table to determine the head address of the unit buffer, wherein the head of the frame is stored. The priority control is achieved by changing the ratio of referring to the head address in accordance with the transfer priority level.

For instance, if the transfer priority has been established as follows:

1st priority level: 2nd priority level: 3rd priority level: 4th priority level=16:8:4:1;

then, the ratio of frequencies of referring to the head address of the respective transfer priority levels of the transmission control table are set to 16:8:4:1, and the frames of the respective transfer priority levels are sent out to the lines in accordance with this ratio. At this time, if, for example, no frame of the first priority level exists on the transmitting buffer 13E, then the frames of the second priority level or lower are sent out to the lines according to the ratio.

If absolute priority is to be given to frames with a higher priority over frames with a lower priority, then the head addresses of the frames having higher priorities than that of the frame, which is about to be transmitted, are also referred to at the same time, and the frame specified by the head address is transferred only if no head address of a higher priority level exists, rather than just transferring the frame in accordance with the head address referring ratio.

The discard priority control will now be described. In this invention, the processing unit 13B of the line set 13 carries out the discard priority control by referring to the two bits indicating the discard priority in the address field illustrated in FIG. 11.

The discard priority control is carried out in relation to the congestion level of the frame relay switching apparatus 10. In this invention, the congestion of the frame relay switching apparatus 10 is categorized in four levels, namely, the 0-level congestion, the 1st-level congestion, the 2nd-level congestion, and the 3rd-level congestion, the congestion becoming heavier in the ascending order.

When congestion occurs, the occurrence of the congestion is reported to the terminal by the BECN and FECN bits in the address field illustrated in FIG. 11 and a consolidated link layer management message as specified by the ITU-T Recommendation for the frame relay.

If the congestion is not resolved and the congestion level increases despite the notice of the occurrence of the congestion given to the terminal, then the frame relay switching apparatus 10 discards frames, beginning with frames with a lower discard priority level according to the congestion level.

In the present invention, the discarding is performed as follows:

0-level congestion

Only the notice of congestion is issued and no discarding is performed.

1st-level congestion

Frames of the third priority level are discarded.

2nd-level congestion

Frames of the second and third priority levels are discarded.

3rd-level congestion

Frames of the first, second and third priority levels are discarded. (All frames are discarded.)

Figure 16:
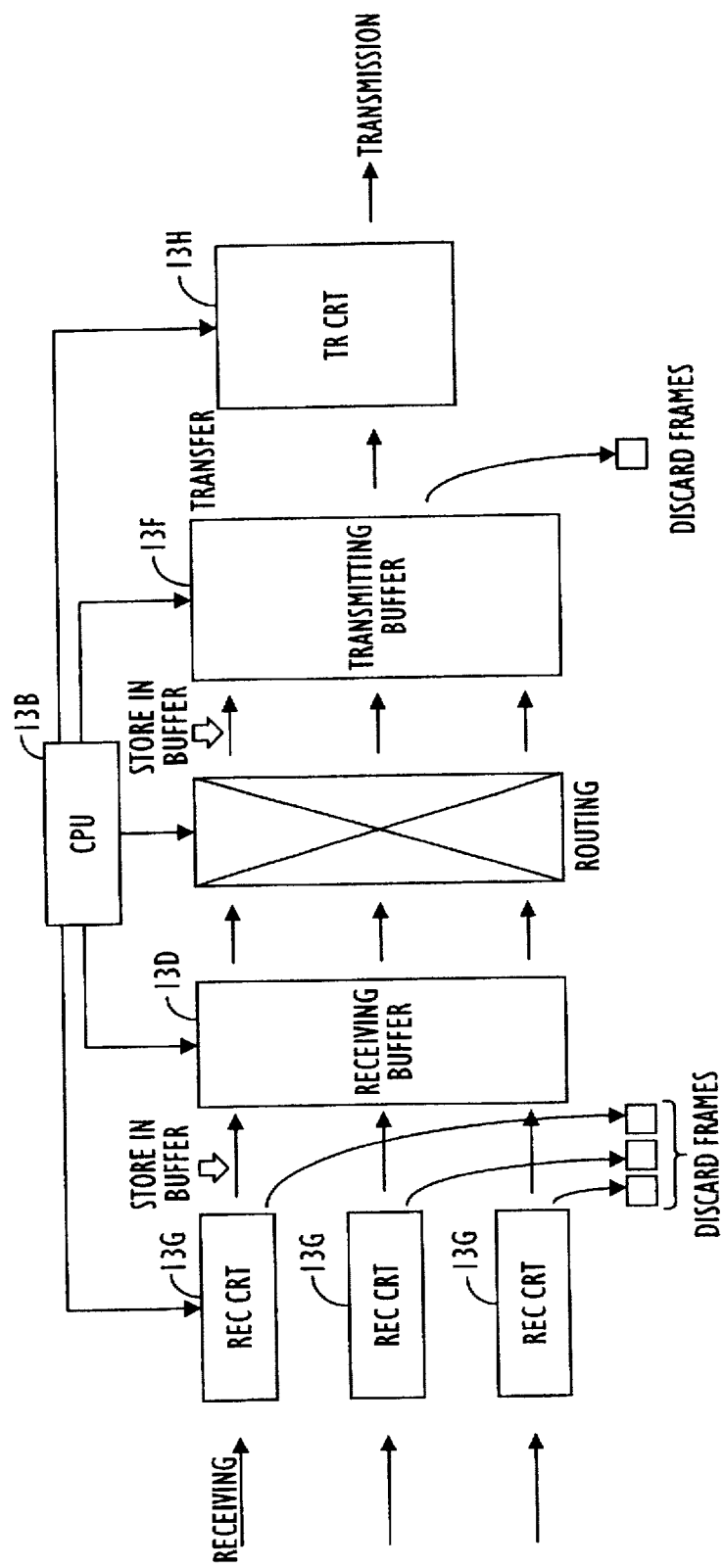
FIG. 16 is a block diagram illustrating the discarding process of frames according to the second embodiment.

FIG. 16 illustrates the discarding of frames according to the second embodiment. The processing unit 13B controls the recieving circuit 13G in accordance with the congestion level and discards received frames according to the priority levels thereof. Further, when transferring a frame from the transmitting buffer 13E to the transmitting circuit 13H, the processing unit 13B refers to the discard priority level of the frame in the unit buffer 13e specified by the head address, then it determines whether the frame to be transferred should be discarded or not according to the then congestion level and the discard priority level. If the processing unit determines that the frame should be discarded, then it does not transfer the frame to the transmitting circuit 13H.

The processing unit stores the next frame address value in the unit buffer 13e as the head address of the transmission control table, then releases the unit buffer 13e and another unit buffer 13e, which is chained by the next buffer address, from the buffer control table, thereby discarding the frame.

The line set 13 is equipped with a transmitting buffer 13E for each line as illustrated in FIG. 4. In order to minimize discarded frames in such a configuration, it would be necessary for the transmitting buffer 13E of each line set 13 to have a large memory area and a huge memory area would be required for the whole frame relay switching apparatus 10.

Hence, a common buffer, which can be shared by a plurality of line sets is provided as the third embodiment according to the present invention.

Figure 17:
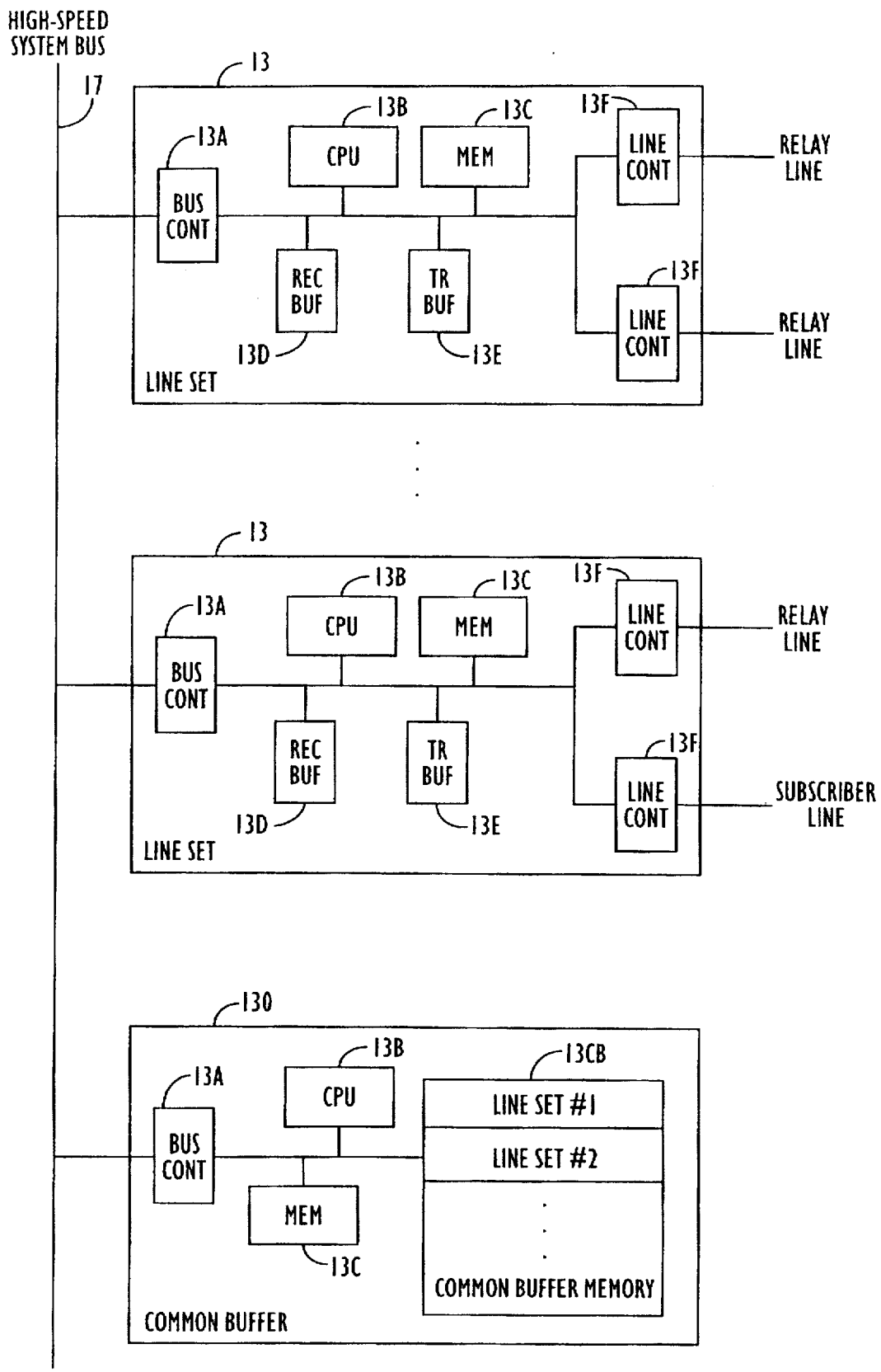
FIG. 17 is a block diagram illustrating the common buffer according to a third embodiment of the present invention.

FIG. 17 illustrates the common buffer according to the third embodiment. As shown in FIG. 17, a common buffer 130 is connected to a high speed system bus 17 through which frames are transferred between the line sets 13 in the frame relay switching apparatus. The common buffer 130 includes a bus controller 13A, a central processing unit 13B, similar to that of the line set, and also a memory 13C and a common buffer memory 13CB.

When the processing unit 13B of the line set 13 detects congestion, a received frame from the line is transferred to the common buffer 130, and when the processing unit 13B no longer detects congestion, the frame, which has been written in the common buffer 130, is taken out and written in the transmitting buffer 13E for a transmitting line, thereby preventing the frame from being discarded.

FIG. 17 shows an example, wherein the common buffer memory 13CB is divided and assigned to each line set 13. This fixed allocation of the common buffer memory to each line set results in the cost saving merit to be described bellow.

Each line set 13 has transmitting buffer 13E having a fixed capacity of memory as described in connection with FIG. 4. Because the line sets are connected to the various types of lines, such as a relay line, a subscriber line, each of which has a different data rate, the transmitting buffer 13E should have various memory capacity according to the type of the line in order to a achieve discard-less communication. However, since the frame relay switching apparatus 10 contains a plurality of line sets 13, it is not efficient at the manufacturing stage to change the memory capacity of the transmitting buffer from one line set to another line set. So it is more advantageous in cost to provide assigned extra areas in the common buffer according to the necessary memory capacity for each line set.

When the processing unit 13B of the line set 13 detects congestion, a received frame is sent out on the high speed system bus 17, after adding the address itself and the address of the common buffer. When the processing unit 13B of the common buffer 130 finds a frame having the address to the common buffer 130, the frame is received by the common buffer 130. And then, the received frame is written into the common buffer memory 13CB with the address of the originating line set 13, so that the common buffer area can be shared without distinction. This leads to higher service rate of the common buffer 130. When the processing unit 13B of line set 13 no longer detects congestion, the originating line set requests to send back the frame, which has been written in the common buffer 130. The processing unit 13B of the common buffer fetch the request and send out the frame after adding the address of originating line set 13 to the high speed system bus 17. The line set 13 takes in the frame by recognizing the address to itself. After taking in the frame, the frame transferred as same as by the process for frames received from another line or another line set 13, thereby preventing the frame from being discarded.

Figure 18:
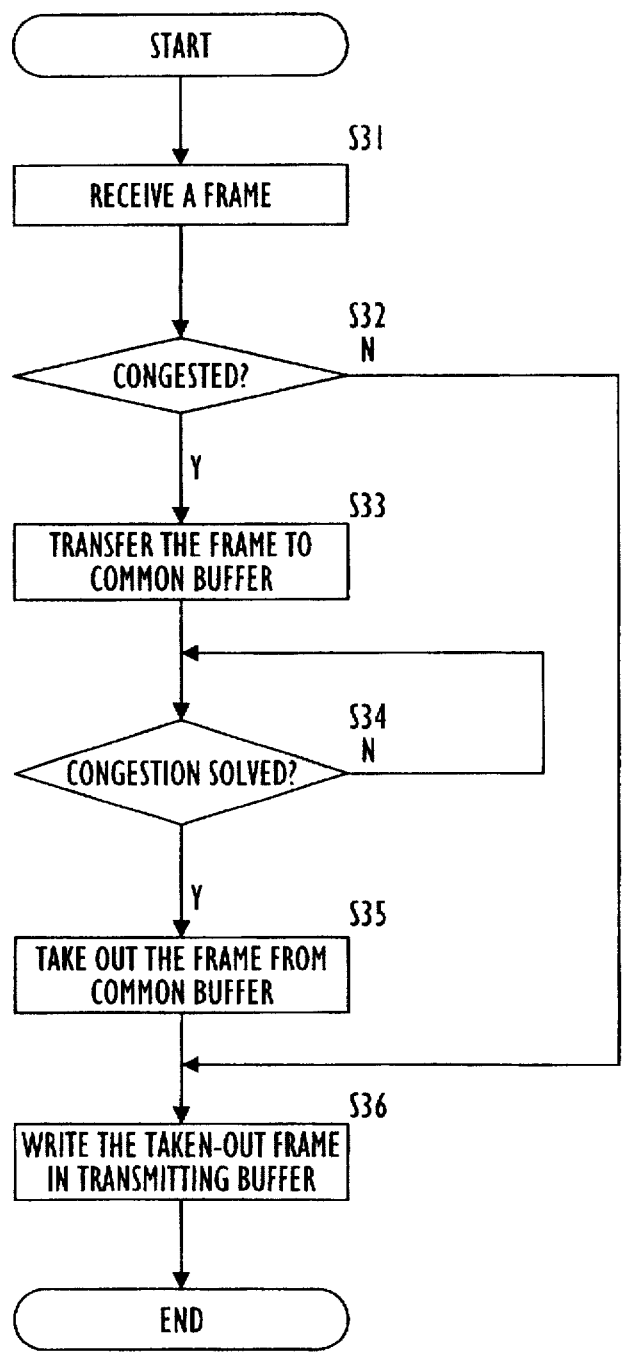
FIG. 18 is a flowchart of the transfer of a frame to the common buffer according to the third embodiment.

FIG. 18 shows the flowchart of the transfer of a frame to the common buffer according to the third embodiment. FIG. 18 illustrates the transferring and fetching of a frame to and from the common buffer in the configuration of FIG. 17. The frame is received in S31, the processing unit 13B checks for congestion in S32, and the received frame is transferred to the common buffer 130 in case of congestion in S33. If the congestion still exists, received frames will be transferred to and written in the common buffer 130. In S34, the processing unit 13B constantly monitors congestion and determines if the congestion has been resolved or not. In S35, if the congestion has been resolved, the frame is taken out from the common buffer 130. In S36, the frame, which has been taken out, is written in the transmitting buffer 13E to make it ready for transmission. If it is determined that no congestion is present in S32, then the processing unit goes to S36, wherein it writes the received frame directly in the transmitting buffer 13E.

In FIG. 17, the common buffer 130 is provided in a discrete form. Alternatively, however, the common buffer memory area for a one line set 13-1, which incorporates an important line or a congestion-prone line may be set for a capacity large enough to deal with maximum congestion so that this common buffer memory area may be used if congestion occurs in other line set. The use of such a configuration makes it possible to avoid discarding of frames of any lines and also to minimize the capacity of the common buffer.

Furthermore, it is also possible to control the discarding of frames in the common buffer 130 in case of congestion in accordance with the priority level of each DLCI in the first embodiment and the 4-level priority specified by the address field in the second embodiment.

Figure 19:
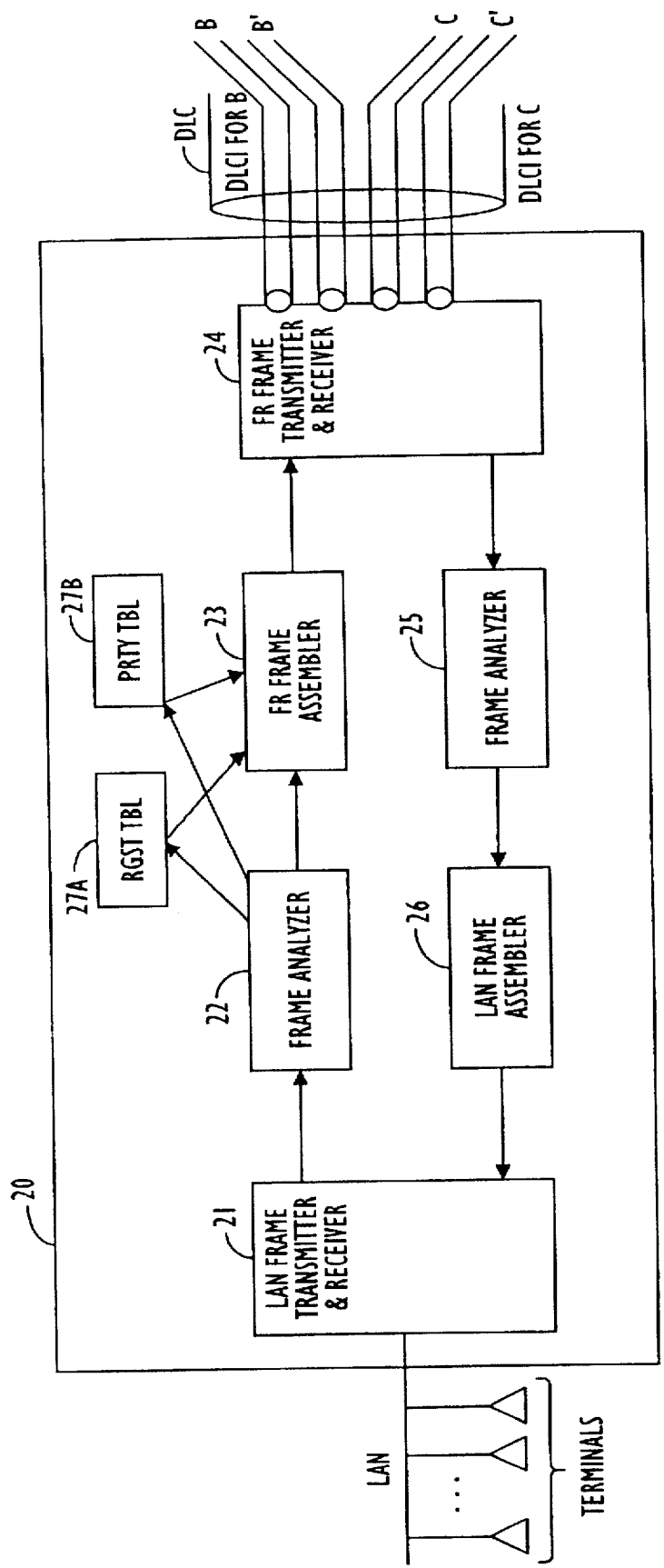
FIG. 19 is a block diagram illustrating the router according to the present invention.

FIG. 19 illustrates the router of the present invention. The function of this router will be explained referring to the frame relay communication system shown in FIG. 5A. When the communication is performed from the LAN 30A to the LAN 30B through the frame relay network 1, the router 20A assembles a LAN frame in LAN 30A into a frame relay frame before sending it into the frame relay network 1, and in the router 20B, the frame received from the frame relay network 1 is assembled into a LAN frame before it is sent into LAN 30B. In the fourth embodiment of this invention, a table, whereby the priority level is set from the address in the LAN of each terminal and the LAN protocol being used, is registered beforehand in the router 20A and the frame sent to the frame relay network 1 is given a priority level.

Figures 20A, 20B, 20C, 20D:
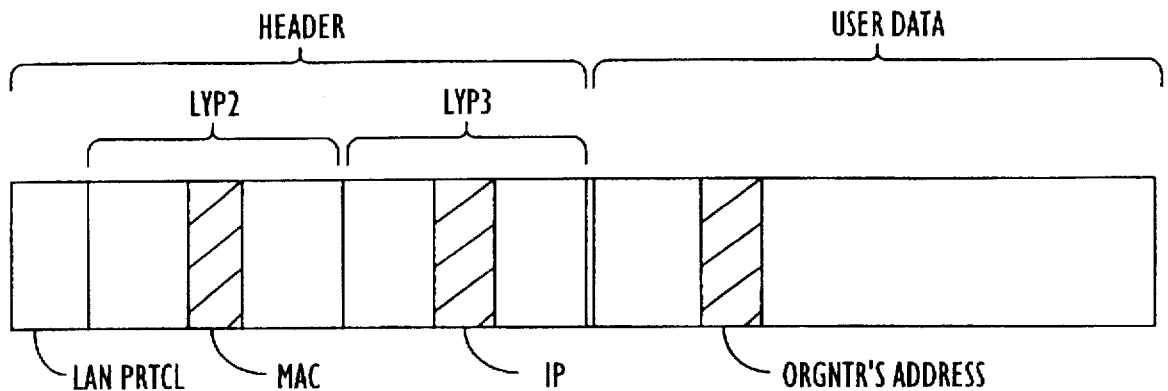
FIG. 20A is a diagram illustrating the LAN frame format according to the present invention.
FIG. 20B is a diagram illustrating the priority table in the router according to the present invention.
FIG. 20C is a diagram illustrating the configuration of the registered table in the router according to the present invention.
FIG. 20D is a diagram illustrating the configuration of the registered table in the router according to the present invention.

FIG. 20A shows an example of a frame format of a LAN frame used in LAN 30A. The frame format starts with a LAN protocol field for controlling the frame within the LAN, which is followed by a header field. The header field includes at least a media access control (MAC) address as layer 2 protocol for indicating the destination terminal of the frame in its own LAN 30A, and TCP/IP address as layer 3 protocol for indicating the destination LAN 30B and destination terminal 30B1. A user data field following the header field has an address of originating terminal 30AT as application layer protocol.

The router 20A connected to the LAN 30A as one of LAN terminals has a MAC address uniquely given previously, and receives the LAN frame via a LAN frame transmitter/receiver 21, by recognizing that the MAC address in the LAN frame is identical to the MAC address previously given. A frame analyzer 22 analyzes the LAN frame received from the LAN frame transmitter/receiver 21 and finds out the destination LAN (network NO.30B) from the ICP/IP address in the LAN frame. When the destination LAN is a remote LAN (a LAN connected through a frame relay line B or C in the drawing), then the frame analyzer refers to the registered table 27A in FIG. 19 to determine the DLCI value on the frame relay line for use in the frame relay network to set up permanent virtual connection to the destination LAN.

The frame analyzer 22 also set the priority level for each LAN frame, from the originator's address which is identified from the user data field of the LAN frame, and/or the type of the LAN protocol, referring to the priority table 27B shown in FIG. 19. In FIG. 20B is shown an example of detailed configuration of the priority table 27B.

FIG. 20C shows the registered table 27A in the router 20A (FIG. 5A) used with the frame relay network which consists of frame relay switching apparatuses described in the first embodiment of this invention. In this ease, for the communication between the one originating LAN 30A and the one destination LAN 30B, a plurality of DLCIs (shown as B,B' in FIG. 19) having different levels of priority has been already registered in the frame relay network. And each of frame relay frames destinating the same remote LAN, for example network number 30B, is attached different DLCI value according to the priority level by referring the priority table, so that the registered table is implemented previously in such a way that different DLCI values, for example 50,51,52, . . . , for the same destination LAN 30B, is written according to priority level.

An FR frame assembler 23 assembles the LAN data into a frame relay frame already shown in FIG. 2 and FIG. 11B by attaching only DLCI respective to the frame priority level for transfer and/or discard priority control in the frame relay network 1. The assembled frame relay frame, is sent out to a frame relay line via an FR frame transmitter/receiver 24.

Then, there will be explained a feature of the router 20A used with the frame relay switching apparatuses described in connections with the second embodiment of this invention. In this case, each of frame relay frames to the same destination LAN are set the same DLCI from registered table 27A shown in FIG. 20D, irrespective of the priority, and are set different priority level according to the frame priority from the priority table 27B. Then the frame assembler 23 assembles the LAN data into a frame relay frame by attaching DLCI and priority level for transfer and/or discard priority control in the frame relay network. The assembled frame relay frame is sent out to a frame relay line via an FR frame transmitter/receiver 24.

Thus, the priority table for setting the priority levels according to LAN addresses or LAN protocols is provided in the router 20, the prioritized DLCI discussed in the first embodiment or the transfer priority and the discard priority discussed in the second embodiment are set in the address field of the frame, by referring to above mentioned tables when a LAN frame is assembled into a frame relay frame, and the frame is sent out to the frame relay network 1, then the frame relay network 1 performs the priority control according to the DLCI or the priority level in the address field of the received frame. This prevents important frames from being discarded and also permits preferential transmission of frames requiring high level of real-time transfer.

At the destination router 20B, the frame received from the frame relay line is sent to a frame analyzer 25 via the FR frame transmitter/receiver 24 and the frame is analyzed before it is sent out to a LAN frame assembler 26. The frame is assembled into a LAN frame before it is sent out to the LAN via the LAN frame transmitter/receiver 21.

What is claimed is:

1. A frame relay switching apparatus in a frame relay network connecting a plurality of terminals, the frame relay network enabling said terminals to communicate with each other in accordance with an identifier provided in a frame being transmitted for identifying a destination terminal, the frame relay switching apparatus comprising:

storing means in which priority information provided respectively for said identifier and indicating a communication processing priority level has been registered so that said priority information can be accessed by the identifier;

adding means for adding the priority information to a received frame by referring to said storage means, the priority information corresponding to the identifier on the received frame; and processing means for carrying out communication processing on the received frame in accordance with said added priority information.

2. A frame relay switching apparatus in a frame relay network connecting a plurality of terminals, the frame relay network enabling said terminals to communicate with each other in accordance with an identifier provided in a frame being transmitted for identifying a destination terminal, the frame relay switching apparatus comprising:

storage means in which the identifier and priority information provided for said identifier have been registered;

determining means for determining a communication processing priority level of a received frame in accordance with the priority information corresponding to the identifier on a received frame by referring to said storage means; and processing means for carrying out communication processing on the received frame in accordance with said determined priority level;

wherein the identifier corresponding to priority information of high priority level concerning frame discarding is registered in said storage means, and further comprising means for performing registration of said identifier and said priority information in such a manner that the sum total of each communication speed of frames having said high priority level identifier does not exceed a physical communication speed of a line through which the frames are transmitted.

3. The frame relay switching apparatus according to claim 1, wherein the identifier corresponding to priority information of low priority level concerning frame discarding is further registered in said storage means; and further comprising means for performing registration of said identifier in such a manner that 1/n of the sum total of each communication speed of the frames having said low priority level identifier does not exceed a difference between a physical communication speed of the line through which the frames are transmitted and the sum total of each communication speed of the frames having said high priority level identifier, n being a number greater than 1.

4. The frame relay switching apparatus according to claim 3, further comprising a transmitting buffer for temporarily storing the frames to be transmitted, wherein when said frame relay switching apparatus receives the frame in a congested state of said transmitting buffer, said frame relay switching apparatus discards both the received frame and all such frames stored in said transmitting buffer having the same identifier as that of said received frame, if the identifier of said received frame corresponds to priority information of low priority level, and said frame relay switching apparatus discards all such frames stored in said transmitting buffer having the same identifier corresponding to priority information of low priority level, if the identifier of said received frame corresponds to priority information of high priority level.

5. A frame switching apparatus in a frame relay network connecting a plurality of sub-networks, the frame relay network enabling the sub-networks to communicate with each other in accordance with a first identifier provided in a frame being transmitted for identifying a destination sub-network, wherein said frame is provided with a second identifier which is given in an originating sub-network and indicates a communication processing priority level of the frame, the communication processing priority level corresponding to a frame attribute recognizable only in the originating sub-network, the frame relay switching apparatus comprising:

adding means for adding, upon receipt of the frame, priority information indicating the communication processing priority level for said received frame in accordance with said second identifier, the priority information being recognizable in the frame relay network; and processing means for carrying out communication processing preferentially for the received frame in accordance with said added priority information.

6. A frame relay switching apparatus in a frame relay network connecting a plurality of terminals, the frame relay network enabling said terminals to communicate with each other in accordance with an identifier provided in a frame being transmitted for identifying a destination terminal, the frame relay switching apparatus comprising:

storage means in which the identifier and priority information provided for said identifier have been registered;

determining means for determining a communication processing priority level of a received frame in accordance with the priority information corresponding to the identifier on a received frame by referring to said storage means; and processing means for carrying out communication processing on the received frame in accordance with said determined priority level;

wherein said processing means includes at least one of transfer priority control means for processing and sending out the received frame with high priority level first and discard priority control means for processing and discarding the received frame with low priority level first.

7. A frame relay switching apparatus in a frame relay network connecting a plurality of sub-networks, the frame relay network enabling the sub-networks to communicate with each other in accordance with a first identifier provided in a frame being transmitted for identifying a destination sub-network; wherein said frame is provided with a second identifier which is given in an originating sub-network and indicates a priority level of the frame, the priority level corresponding to a frame attribute recognizable only in the originating sub-network, the frame relay switching apparatus comprising:

determining means for determining, upon receipt of the frame, a communication processing priority level for said received frame in accordance with said second identifier; and processing means for carrying out communication processing preferentially for said received frame in accordance with said determined priority level;

wherein said processing means includes at least one of transfer priority control means for processing and sending out the received frame with high priority level first and discard priority control means for processing and discarding the received frame with low priority level first.

8. A frame relay switching apparatus in a frame relay network connecting a plurality of sub-networks, the frame relay network enabling the sub-networks to communicate with each other in accordance with a first identifier provided in a frame being transmitted for identifying a destination sub-network; wherein said frame is provided with a second identifier which is given in an originating sub-network and indicates a priority level of the frame, the priority level corresponding to a frame attribute recognizable only in the originating sub-network, the frame relay switching apparatus comprising:

determining means for determining, upon receipt of the frame, a communication processing priority level for said received frame in accordance with said second identifier; and processing means for carrying out communication processing preferentially for said received frame in accordance with said determined priority level;

wherein said second identifier comprises at least one of a transfer priority control bit and a discard priority control bit, both provided in a data link connection identifier(DCLI) field of a frame relay frame.

9. The frame relay switching apparatus according to claim 7, further comprising a transmitting buffer, wherein said transfer priority control means is configured for controlling the transmission of the received frame by preferentially reading a table of high priority level from transmission management tables for managing information on a storing position of the received frame stored in said transmitting buffer, said transmission management tables being provided in said frame relay switching apparatus for respective priority levels.

10. The frame relay switching apparatus according to claim 7, further comprising a transmitting buffer, and wherein said transfer priority control means causes the received frame of the next high priority level to be transmitted if said transmitting buffer has no received frame having priority of high level.

11. A frame relay switching apparatus in a frame relay network connecting a plurality of terminals, the frame relay network enabling the terminals to communicate with each other in accordance with an identifier provided in a frame being transmitted for identifying a destination terminal; the switching apparatus comprising:

a plurality of transmitting buffer means for temporarily storing frames to be sent out to an outgoing line, said transmitting buffer means being provided at each outgoing line;

frame receiving means for providing a received frame from an incoming line with an address of the transmitting buffer means of the outgoing line, and sending out said frame; and common buffer means for temporarily saving the frame to be stored in respective transmitting buffer means if the number of the frames stored in said transmitting buffer means exceeds a predetermined number, storing the frame to be saved in said common buffer means being executed with said frame receiving means by providing the frame to be saved with the address of said common buffer means and sending out the frame to a common bus, and with said common buffer means by receiving the frame in accordance with the provided address.

12. The frame relay switching apparatus according to claim 11, wherein a storage of said common buffer means is divided into storage areas each of which is assigned to each of said transmitting buffer means.

13. The frame relay switching apparatus according to claim 11, wherein said saved frame is written into any storage area of said common buffer means; said frame relay switching apparatus further comprising a management table for performing management by referring information on said storage area to information on identifying said transmitting buffer means from which the frame has been saved.

14. The frame relay switching apparatus according to claim 11, wherein said common buffer means is used for saving only the frame with high discard priority level.

15. A router provided between an LAN (Local Area Network) and a frame relay network to transmit data to and receive data from each other, the router comprising:

priority storage means in which a priority information is registered respectively for an identifier of a LAN frame, the priority information indicating a communication processing priority level for data of a frame in the frame relay network; and converting means for adding the priority information on the LAN frame from said priority storage means in accordance with the identifier of a received LAN frame, and for converting said LAN frame into a frame relay frame to which said priority information has been added so as to be recognizable in the frame relay network, and sending out said frame relay frame to the frame relay network.

16. A router provided between an LAN (Local Area Network) and a frame relay network to transmit data to and receive data from each other, the router comprising:

priority storage means in which a priority information is registered respectively for an identifier of an LAN frame, the priority information indicating a communication processing priority level for data of a frame in the frame relay network; and converting means for adding the priority information on the LAN frame from said priority storage means in accordance with the identifier of a received LAN frame, and for converting said LAN frame into a frame relay frame to which said priority information has been added so as to be recognizable in the frame relay network, and sending out said frame relay frame to the frame relay network;

wherein said converting means carries out an addition of said priority information by incorporating a second identifier which indicates the priority level of the LAN frame into said frame relay frame.

17. A router provided between an LAN (Local Area Network) and a frame relay network to transmit data to and receive data from each other, the router comprising:

priority storage means in which a priority information is registered respectively for an identifier of an LAN frame, the priority information indicating a communication processing priority level for data of a frame in the frame relay network; and converting means for adding the priority information on the LAN frame from said priority storage means in accordance with the identifier of a received LAN frame, and for converting said LAN frame into a frame relay frame to which said priority information has been added so as to be recognizable in the frame relay network, and sending out said frame relay frame to the frame relay network;

wherein said converting means carries out an addition of the priority information by differentiating, in accordance with the priority level, an identifier for identifying a destination terminal which is added when converting the received LAN frame into the frame relay frame.

18. A frame relay switching apparatus in a frame relay network connecting a plurality of terminals, the frame relay network enabling the terminals to communicate with each other in accordance with an identifier provided in a frame being transmitted for identifying a destination terminal, the frame relay switching apparatus comprising:

storage means in which priority information provided respectively for the identifier has been stored so that said priority information can be accessed by the identifier;

determining means for determining a communication processing priority level of a received frame in accordance with the priority information corresponding to the identifier on the received frame by referring to said storage means; and processing means for carrying out communication processing on the received frame in accordance with said determined priority level.

19. A router provided between a LAN (Local Area Network) and a frame relay network to transmit data to and receive data from each other, the router comprising:

analyzing means for extracting an address of a destination to which the data is transmitted through the frame relay network and for extracting necessary information for determining a communication processing priority level in the frame relay network from a LAN frame;

priority table means in which priority information provided respectively for the necessary information have been registered;

registered table means in which an identifier recognizable by the frame relay network is register respectively for the address and the necessary information; and converting means for converting the LAN frame into a frame relay frame to which the identifier, acquired from said registered table means by using the address and the necessary information, is given, and sending out the frame relay frame to the frame relay network.

* * * * *